(12) United States Patent
Koyama

(10) Patent No.: US 11,054,715 B2
(45) Date of Patent: Jul. 6, 2021

(54) OPTICAL DEFLECTION APPARATUS

(71) Applicant: TOPPAN PRINTING CO., LTD., Tokyo (JP)

(72) Inventor: Masaki Koyama, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/095,351

(22) Filed: Nov. 11, 2020

(65) Prior Publication Data

US 2021/0063839 A1 Mar. 4, 2021

Related U.S. Application Data

(63) Continuation of application No. PCT/JP2019/019107, filed on May 14, 2019.

(30) Foreign Application Priority Data

May 15, 2018 (JP) .............................. JP2018-093638

(51) Int. Cl.
*G02F 1/29* (2006.01)
(52) U.S. Cl.
CPC .......... *G02F 1/29* (2013.01); *G02F 2201/121* (2013.01); *G02F 2203/02* (2013.01); *G02F 2203/24* (2013.01)
(58) Field of Classification Search
None
See application file for complete search history.

(56) References Cited

U.S. PATENT DOCUMENTS

| 5,943,159 A | 8/1999 | Zhu |
| 8,982,313 B2 | 3/2015 | Escuti et al. |
| 2001/0055145 A1* | 12/2001 | Hamada ................... G02B 3/14 359/290 |

(Continued)

FOREIGN PATENT DOCUMENTS

| JP | 5-80358 A | 4/1993 |
| JP | 2001-194635 A | 7/2001 |

(Continued)

OTHER PUBLICATIONS

English translation of Written Opinion of ISA (dated Aug. 13, 2019)—International Preliminary Report on Patentability (PCT/IB/237), dated Nov. 26, 2020, in corresponding International Patent Application No. PCT/JP2019/019107.

(Continued)

*Primary Examiner* — Ryan Crockett

(57) ABSTRACT

An optical deflection apparatus includes a deflection element and an incidence plane limiting unit limiting incidence of a laser beam on a range of an incidence plane. The deflection element including first and second panels, which including first and second repeating units. Each panel includes first and second substrates, a liquid crystal layer, an electrode for each repeating unit, and a common electrode. The electrodes of the first and second panel in a same repeating unit include first ends coinciding with each other, and second ends different from each other. The range is included in a range from the second end of the first electrode of the first panel in the first repeating unit to the second end of the first electrode of the second panel in the second repeating unit.

14 Claims, 24 Drawing Sheets

(56) References Cited

U.S. PATENT DOCUMENTS

| | | | | |
|---|---|---|---|---|
| 2005/0100270 A1* | 5/2005 | O'Connor | ................ | G02B 3/14 |
| | | | | 385/19 |
| 2014/0267955 A1* | 9/2014 | Hibayashi | ......... | G02F 1/134309 |
| | | | | 349/12 |
| 2015/0035873 A1* | 2/2015 | Shima | ............... | G02F 1/133514 |
| | | | | 345/690 |
| 2017/0269453 A1* | 9/2017 | Galstian | ................ | G02F 1/1337 |
| 2020/0363038 A1* | 11/2020 | Koyama | ............... | F21V 7/0033 |

FOREIGN PATENT DOCUMENTS

| | | |
|---|---|---|
| JP | 2011-134619 A | 7/2011 |
| JP | 2013-522670 A | 6/2013 |

OTHER PUBLICATIONS

International Search Report dated Aug. 13, 2019, in corresponding International Patent Application No. PCT/JP2019/019107.
Written Opinion of the International Searching Authority dated Aug. 13, 2019, in corresponding International Patent Application No. PCT/JP2019/019107.

* cited by examiner

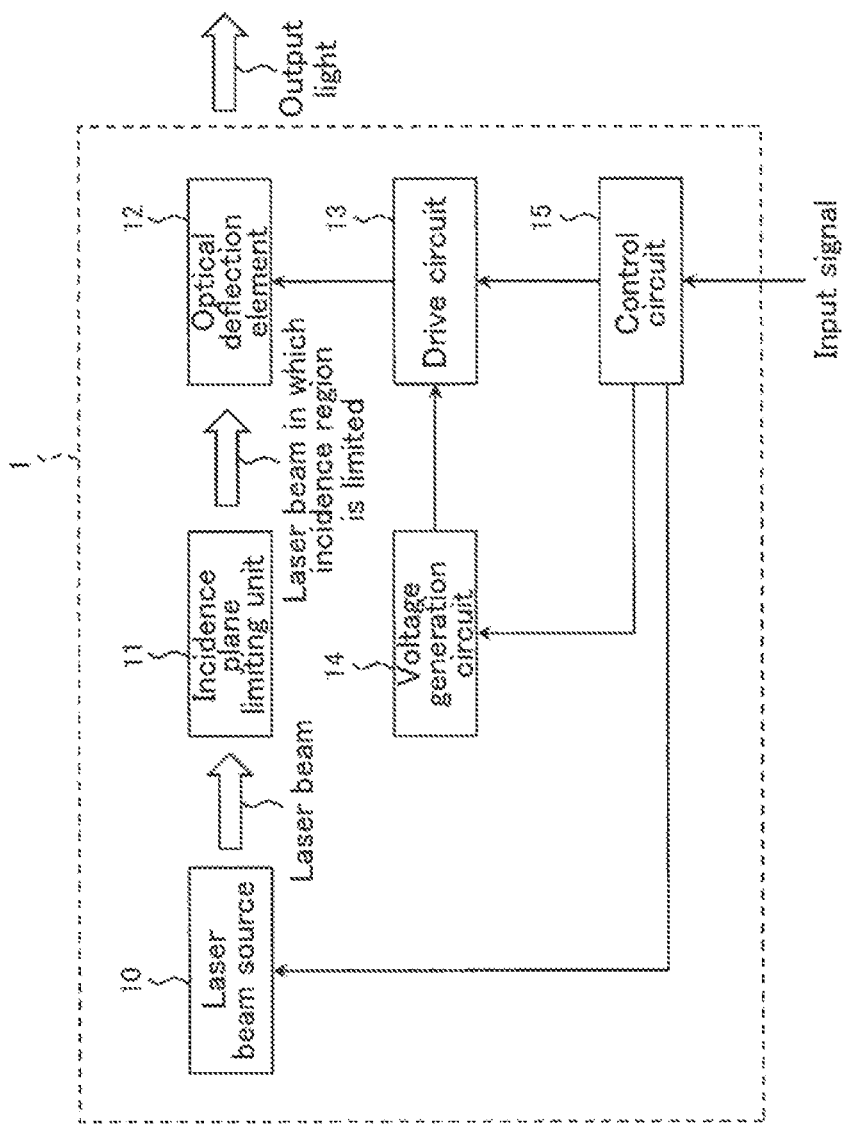
F I G. 1

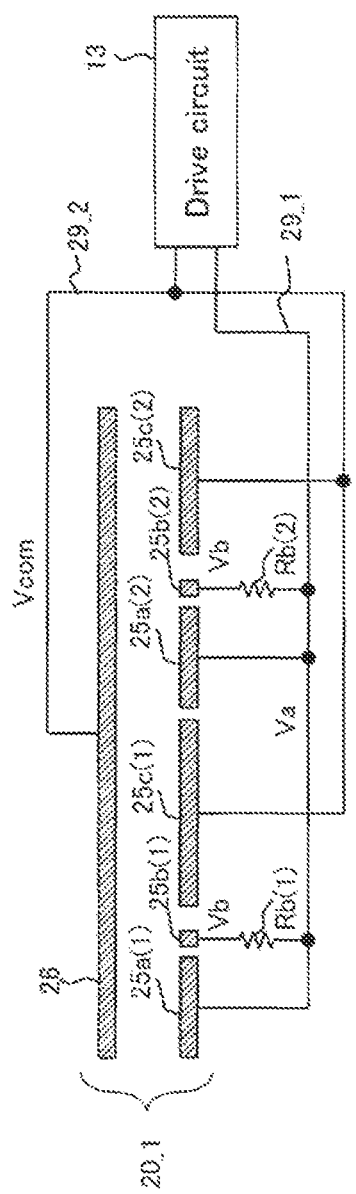
F I G. 12

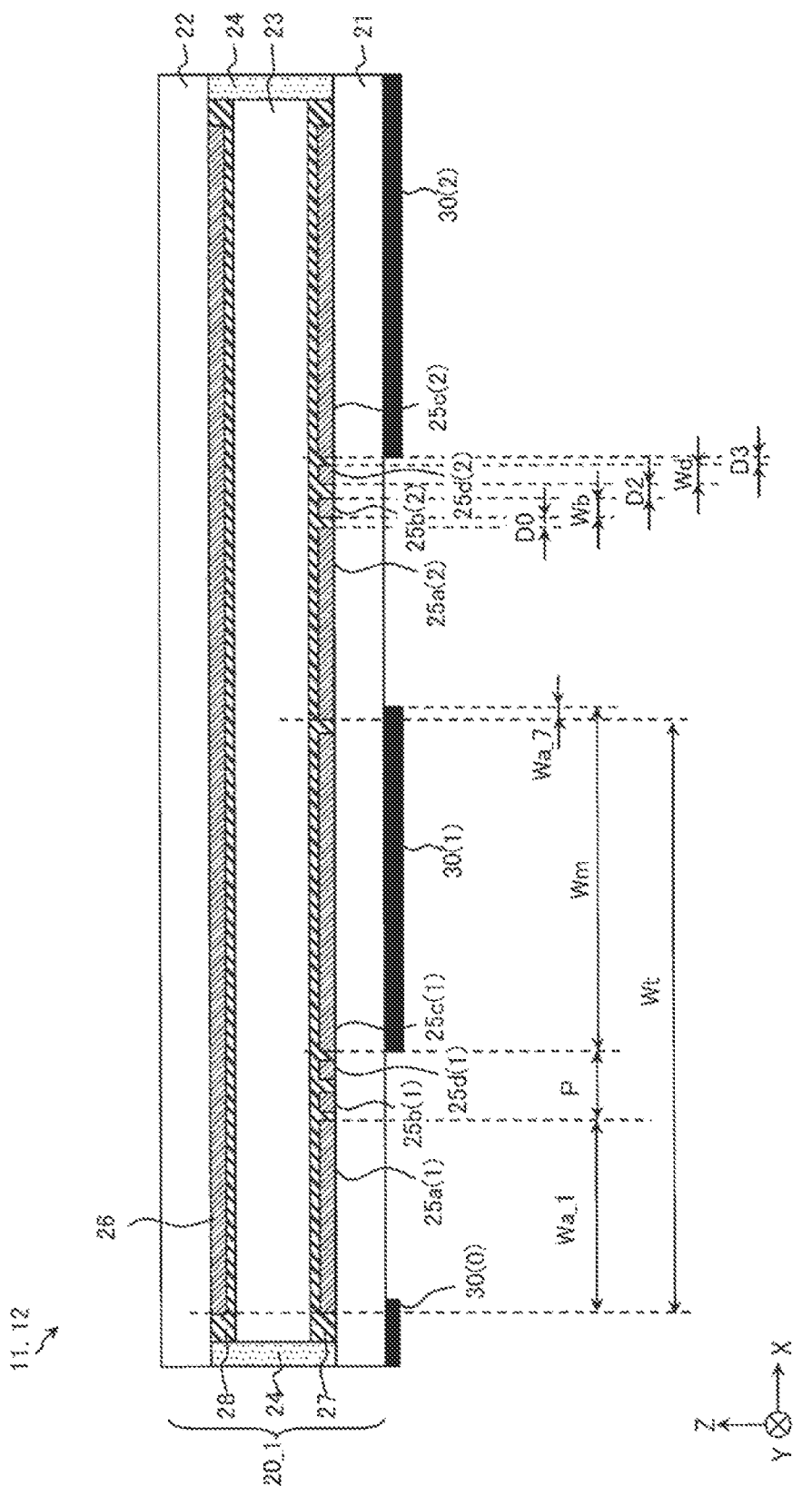
F I G. 13

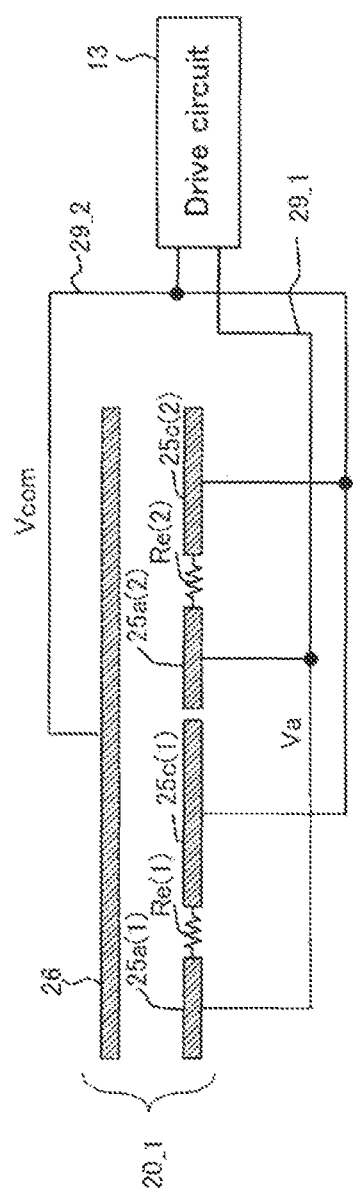
F I G. 16

OPTICAL DEFLECTION APPARATUS

CROSS-REFERENCE TO RELATED APPLICATIONS

This application is a Continuation Application of PCT Application No. PCT/JP2019/019107, filed May 14, 2019, and based upon and claiming the benefit of priority from Japanese Patent Application No. 2018-093638, filed May 15, 2018, the entire contents of all of which are incorporated herein by reference.

FIELD

The present invention relates to an optical deflection apparatus using a liquid crystal element.

BACKGROUND

In recent years, laser diode manufacturing technology has been rapidly developing, which has led to an expansion of the field of application of lasers from industrial use to consumer use. For example, laser illumination in which illumination light is obtained by causing a laser to enter a phosphor has begun to be adopted as a laser headlamp in some vehicle models. In addition, for example, light detection and ranging (LIDAR) that measures a distance to an object by reflecting a pulsed laser on the object is used in an advanced driving assistant system (ADAS) or automated driving. However, at present, the price of a laser diode is higher than that of a light emitting diode (LED). Therefore, in order to reduce costs of a laser device such as the above-described laser illumination or LIDAR, it is desirable to use a small number of laser diodes.

As a method of utilizing a small number of laser beam sources effectively, a method that uses an element capable of scanning or switching laser beams has been proposed. As a laser beam scanning method, a method using a galvano mirror, a polygon mirror, a micro electro mechanical systems (MEMS) mirror, an acoustic optics (AO) element, an electro optics (EO) element, or the like, is known. However, since the scanning method using the galvano mirror, the polygon mirror, or the like requires a movable portion, due to vibration of a vehicle or the like, there is a concern about long-term reliability. Furthermore, these scanning methods use expensive components, which increases the cost of the laser scanning apparatus. Moreover, there has been a problem of the laser scanning apparatus becoming large depending on the method.

CITATION LIST

Patent Literatures

Patent Literature 1: U.S. Pat. No. 8,982,313
Patent Literature 2: Jpn. Pat. Appln. KOKAI Publication No. 2011-134619

SUMMARY

The present invention provides an optical deflection apparatus capable of scanning a laser beam while suppressing an increase in size.

According to one embodiment, an optical deflection apparatus, includes a deflection element that includes an incidence plane for receiving a laser beam emitted from a beam source, and deflects the laser beam; and an incidence plane limiting unit that is provided between the beam source and the deflection element, and limits incidence of the laser beam on the incidence plane. The deflection element includes a first liquid crystal panel and a second liquid crystal panel that are stacked, each of which including a first repeating unit and a second repeating unit that are aligned in a first direction along the incidence plane. Each of the first liquid crystal panel and the second liquid crystal panel includes a first substrate, a second substrate, a first liquid crystal layer filled into a space between the first substrate and the second substrate, a first electrode provided on the first substrate for each of the first repeating unit and the second repeating unit, and a first common electrode provided on the second substrate. The first electrode of the first liquid crystal panel and the first electrode of the second liquid crystal panel in a same repeating unit including first ends disposed at positions substantially coinciding with each other in the first direction, and second ends disposed at positions different from each other in the first direction. The incidence plane limiting unit limiting incidence of the laser beam on a first range of the incidence plane. The first range is included in a range from a first position corresponding to the second end of the first electrode of the first liquid crystal panel in the first repeating unit to a second position corresponding to the second end of the first electrode of the second liquid crystal panel in the second repeating unit.

According to the present invention, it is possible to provide an optical deflection apparatus capable of scanning a laser beam while suppressing an increase in size.

BRIEF DESCRIPTION OF THE DRAWINGS

FIG. 1 is a block diagram for explaining a configuration of an optical deflection apparatus according to a first embodiment;

FIG. 12 is a circuit diagram for explaining a configuration of electrodes in the optical deflection element according to the second modification of the first embodiment;

FIG. 13 is a cross-sectional view for explaining a configuration of an incidence plane limiting unit and an optical deflection element according to a third modification of the first embodiment;

FIG. 16 is a circuit diagram for explaining a configuration of electrodes in the optical deflection element according to the fourth modification of the first embodiment;

DETAILED DESCRIPTION

Figure 2:
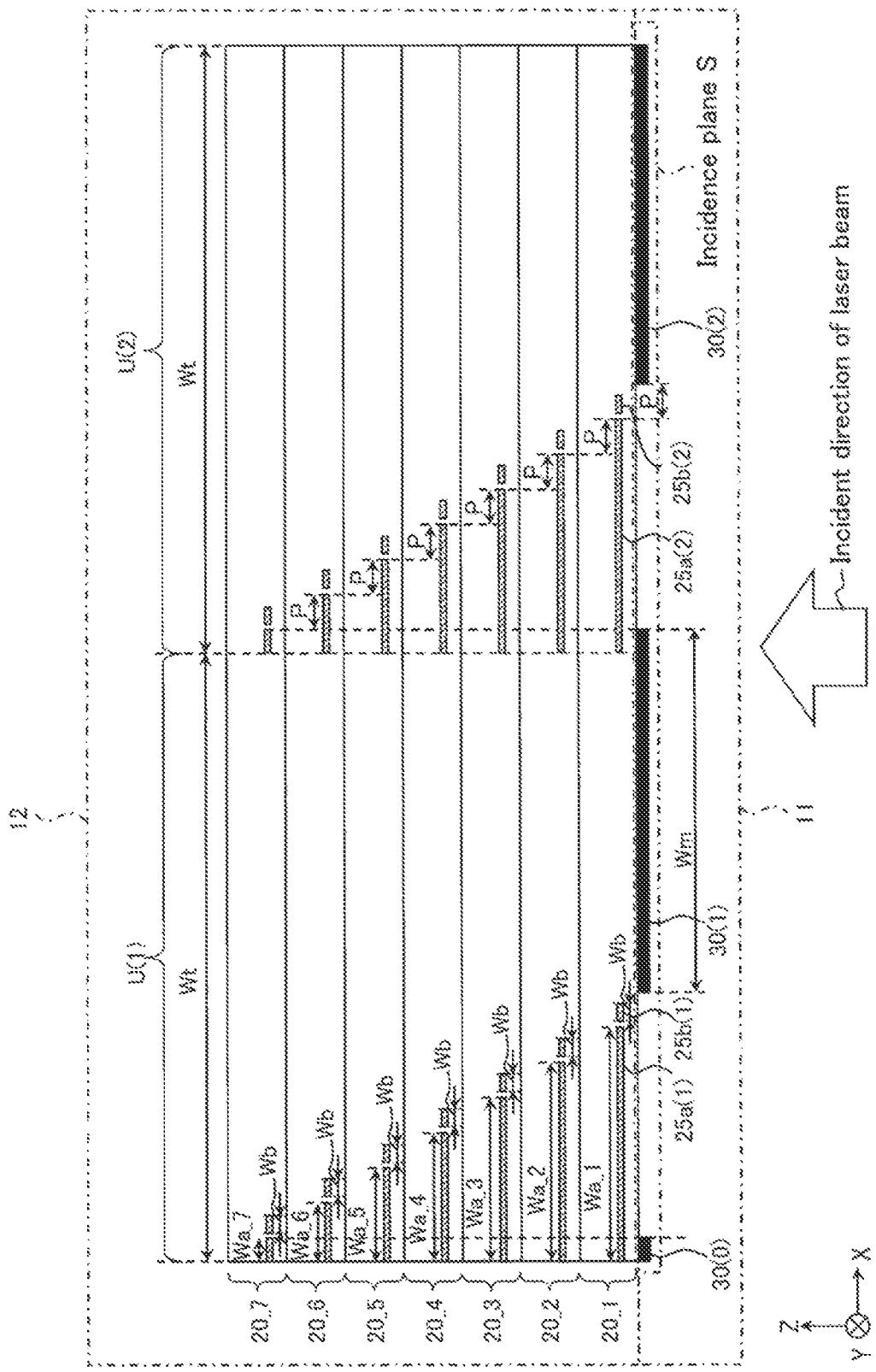
FIG. 2 is a schematic cross-sectional view for explaining an overall configuration of an incidence plane limiting unit and an optical deflection element according to the first embodiment.

Hereinafter, embodiments will be described with reference to the drawings. Note that the drawings are schematic or conceptual, and the dimensions and proportions of the drawings are not necessarily the same as the actual ones. Furthermore, even when parts shown in the drawings indicate the same part, they may be expressed with different dimensional relationships or ratios. In particular, several embodiments described below exemplify an apparatus and a method for embodying the technical idea of the present invention, and the technical idea of the present invention is not specified by the shape, structure, arrangement, or the like of the components. In the following description, elements having the same function and configuration will be denoted by the same reference numerals, and redundant descriptions will be made only when necessary.

First Embodiment

[1] Configuration of Optical Deflection Apparatus

First, a configuration of an optical deflection apparatus according to the first embodiment will be described.

[1-1] Block Configuration of Optical Deflection Apparatus

FIG. 1 is a block diagram for explaining a configuration of an optical deflection apparatus according to the first embodiment.

As shown in FIG. 1, an optical deflection apparatus 1 includes a laser beam source 10, an incidence plane limiting unit 11, an optical deflection element 12, a drive circuit 13, a voltage generation circuit 14, and a control circuit 15.

The laser beam source 10 includes, for example, a laser diode, and emits a laser beam toward the optical deflection element 12. The laser beam source 10 emits a laser beam having a single wavelength, but any value is applicable to the wavelength in accordance with use.

The incidence plane limiting unit 11 is provided between the laser beam source 10 and the optical deflection element 12, that is, on an incidence path of the laser beam emitted from the laser beam source 10 to the optical deflection element 12. The incidence plane limiting unit 11 is configured to limit incidence of the laser beam from part of a plane on which the laser beam may be incident (hereinafter also referred to "incidence plane") in the optical deflection element 12.

The optical deflection element 12 receives the laser beam from the laser beam source 10 on the incidence plane limited by the incidence plane limiting unit 11, and transmits the laser beam. The optical deflection element 12 is configured to deflect the emission direction of the laser beam with respect to the incident direction in the process of transmitting the laser beam. The optical deflection element 12 is configured by stacking a plurality of liquid crystal panels each including a liquid crystal layer, and each liquid crystal panel includes a plurality of electrodes for controlling alignment of the liquid crystal layer. Concrete configurations of the incidence plane limiting unit 11 and the optical deflection element 12 will be described later.

The laser beam emitted from the laser beam source 10 is linearly polarized light that oscillates along a certain polarization axis. The polarization direction (polarization axis) of the optical deflection element 12 is set parallel to the polarization direction of the laser beam. The polarization axis of the optical deflection element 12 is a direction parallel to a plane in which long axes (directors) of liquid crystal molecules in a liquid crystal layer move in accordance with an electric field.

The drive circuit 13 is electrically coupled to a plurality of electrodes included in the optical deflection element 12. The drive circuit 13 drives the optical deflection element 12 by applying a plurality of voltages to the optical deflection element 12.

The voltage generation circuit 14 generates a plurality of voltages necessary for the operation of the optical deflection apparatus 1 by using an external power supply (not shown). The voltages generated by the voltage generation circuit 14 are supplied to each of the modules in the optical deflection apparatus 1, particularly to the drive circuit 13.

The control circuit 15 comprehensively controls the operation of the optical deflection apparatus 1. Upon receipt of an input signal instructing to output the laser beam from the outside of the optical deflection apparatus 1, the control circuit 15 is able to control the laser beam source 10, the drive circuit 13, and the voltage generation circuit 14 based on the input signal.

[1-2] Configuration of Incidence Plane Limiting Unit and Optical Deflection Element Next, the configurations of the incidence plane limiting unit 11 and the optical deflection element 12 will be described. In the following description, an incident direction of a laser beam is defined as a Z direction, while a plane perpendicular to the Z direction is defined as an XY plane. An X direction and a Y direction intersect each other in the XY plane, and the X direction is described as coinciding with the left-right direction in the drawing sheet.

[1-2-1] Overall Configurations of Incidence Plane Limiting Unit and Optical Deflection Element FIG. 2 is a schematic cross-sectional view for explaining an overall configuration of the incidence plane limiting unit and the optical deflection element of the optical deflection apparatus according to the first embodiment.

First, the configuration of the optical deflection element 12 will be described.

As shown in FIG. 2, the optical deflection element 12 is configured by stacking a plurality of liquid crystal panels 20. The example of FIG. 2 shows, as an example, a case where seven liquid crystal panels 20_1 to 20_7 are stacked in this order in the Z direction. That is, the liquid crystal panel 20_1 is a liquid crystal panel closest to the laser beam source 10, and has a plane corresponding to the laser beam incidence plane S along the XY plane. The liquid crystal panel 20_7 is a liquid crystal panel disposed at a position farthest from the laser beam source 10, and has a plane corresponding to a laser beam emission plane along the XY plane. The liquid crystal panels 20_1 to 20_7 are stacked using, for example, a transparent adhesive.

The liquid crystal panels 20_1 to 20_7 are configured by repeating the same configuration (repeating unit U) multiple times in the X direction. The repeating unit U has, for example, width Wt in the X direction. In the example of FIG. 2, the width Wt is designed to be, for example, approximately 520 μm. The example of FIG. 2 shows, as an example, a case where the liquid crystal panels 20_1 to 20_7 have two repeating units U(1) and U(2); however, the present invention is not limited thereto, and the liquid crystal panels 20_1 to 20_7 may have any number of repeating units U greater than two. The stacking order of the liquid crystal panels 20_1 to 20_7 is desirably in such a manner that widths Wa of electrodes 25a are stepwise from the viewpoint of emitting a laser beam having strong directivity.

For the sake of convenience of description, FIG. 2 particularly shows the configurations not shared by the repeating units U but are individually provided for each repeating unit U, among the configurations included in the liquid crystal panels 20_1 to 20_7. Specifically, each of the liquid crystal panels 20_1 to 20_7 includes electrodes 25a and 25b for each repeating unit U. More specifically, each of the liquid crystal panels 20_1 to 20_7 includes electrodes 25a(1) and 25b(1) in the repeating unit U(1), and electrodes 25a(2) and 25b(2) in the repeating unit U(2).

In the repeating unit U, a total of seven electrodes 25a, one of which is included in each of the liquid crystal panels 20_1 to 20_7, are arranged in such a manner that left ends thereof are aligned in the X direction while positions of right ends thereof are different from one another. Each of the seven electrodes 25a has width Wa (Wa_1 to Wa_7) in the X direction, and widths Wa_1 to Wa_7 are shorter in this order (Wa_1>Wa_2> . . . >Wa_7). In other words, in the repeating unit U, the seven electrodes 25a are formed in a stepwise manner in the Z direction. Difference P (also referred to as "shift pitch P") between widths Wa of two adjacent electrodes 25a among the seven electrodes 25a aligned in the Z direction is constant. For example, width Wa_1 of the electrode 25a of the liquid crystal panel 20_1 is designed to be 123 μm, width Wa_7 of the electrode 25a of the liquid crystal panel 20_7 is designed to be 3 μm, and shift pitch P is designed to be 20 μm.

In the repeating unit U, a total of seven electrodes 25b, one of which is included in each of the liquid crystal panels 20_1 to 20_7, are arranged on the right side of the electrodes 25a in the X direction. The seven electrodes 25b each have width Wb in the X direction. In other words, the widths of the seven electrodes 25b are equal to each other. For example, width Wb of the electrode 25b is set to 7 μm.

Next, the configuration of the incidence plane limiting unit 11 will be described with reference to FIG. 2.

As described above, the incidence plane limiting unit 11 is provided between the laser beam source 10 and the optical deflection element 12, and is configured to limit incidence of the laser beam on part of the incidence plane S. The incidence plane limiting unit 11 is provided to be in contact with the plane of the liquid crystal panel 20_1 on the laser beam source 10 side.

In the example of FIG. 2, the incidence plane limiting unit 11 includes light shielding masks 30 (30(0), 30(1), and 30(2)) according to the repeating units U(1) and U(2) of the optical deflection element 12. For the light shielding mask 30, any material not transmitting the laser beam incident from the laser beam source 10 is applicable, and for example, a film is formed using molybdenum (Mo). The light shielding mask 30 has a thickness of, for example, 180 nm in the Z direction. Alternatively, a resin containing a black dye may be used as the light shielding mask 30.

Both ends of the light shielding mask 30(0) coincide with both ends of the electrode 25a of the liquid crystal panel 20_7 in the repeating unit U(1) in the X direction. That is, the light shielding mask 30(0) has width Wa_7 in the X direction.

The left end of the light shielding mask 30(1) is aligned with a position shifted in the X direction (right direction) by shift pitch P from the right end of the electrode 25a of the liquid crystal panel 20_1 in the repeating unit U(1). The right end of the light shielding mask 30(1) coincides with the right end of the electrode 25a of the liquid crystal panel 20_7 in the repeating unit U(2). The light shielding mask 30(1) has width Wm in the X direction. In the example of FIG. 2, the widths Wm and Wt have the relationship of the following equation (1).

$$Wt=(Wa\_1)+(P)+(Wm)-(Wa\_7) \quad (1)$$

That is, in the example of FIG. 2, the width Wt is designed to be approximately 380 μm.

The left end of the light shielding mask 30(2) is aligned with a position shifted in the X direction (right direction) by shift pitch P from the right end of the electrode 25a of the liquid crystal panel 20_1 in the repeating unit U(2). The light shielding mask 30(1) has, for example, width Wm. If the repeating unit U(2) is located at the rightmost end of the optical deflection element 12, the right end of the light shielding mask 30(2) may coincide with the right end of the repeating unit U(2).

With the above-described configuration, the incidence plane limiting unit 11 shields the laser beam incident on a region of the incidence plane S where the light shielding masks 30(0) to 30(2) are provided.

[1-2-2] Configuration of Liquid Crystal Panel

Next, a specific configuration of the liquid crystal panel 20 will be described with reference to FIGS. 3 and 4.

Figure 3:
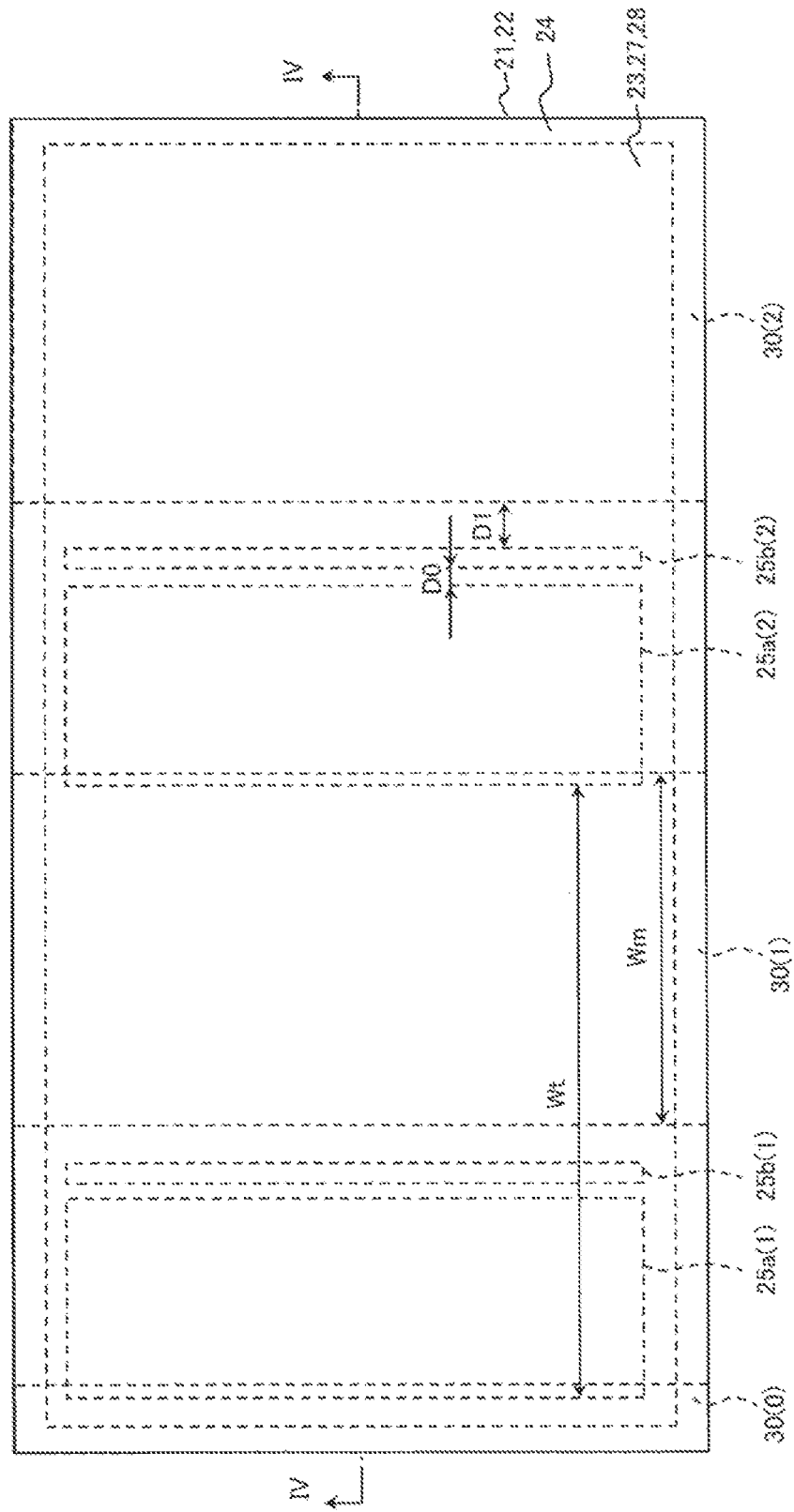
FIG. 3 is a plan view for explaining a configuration of a liquid crystal panel according to the first embodiment.

FIG. 3 is a plane view for explaining a configuration of the liquid crystal panel and a positional relationship of the incidence plane limiting unit of the optical deflection apparatus according to the first embodiment. FIG. 3 shows a plane view of one liquid crystal panel 20_1 and the incidence plane limiting unit 11 of the optical deflection element 20 described with reference to FIG. 2. FIG. 4 is a cross-sectional view of the liquid crystal panel 20_1 and the incidence plane limiting unit 11 taken along line IV-IV in FIG. 3. The configurations of other liquid crystal panels 20_2 to 20_7 are the same as that of the liquid crystal panel 20_1 except for the difference in the width of the electrode 25a; therefore, the description thereof will be omitted.

The liquid crystal panel 20_1 is a transmissive liquid crystal element. The liquid crystal panel 20_1 includes substrates 21 and 22 disposed to face each other, and a liquid crystal layer 23 interposed between the substrates 21 and 22. Each of the substrates 21 and 22 is formed of a transparent substrate (for example, a glass substrate or a plastic substrate). For example, the substrate 21 is disposed on the laser beam source 10 side, and the laser beam from the laser beam source 10 enters the liquid crystal layer 23 from the substrate 21 side.

The liquid crystal layer 23 is filled into a space between the substrates 21 and 22. Specifically, the liquid crystal layer 23 is sealed in a region surrounded by the substrates 21 and 22 and a seal member 24. The seal member 24 is formed of, for example, an ultraviolet curing resin, a thermosetting resin, or an ultraviolet/heat combination type curing resin, and is cured by ultraviolet irradiation, heating, or the like after being applied to the substrate 21 or 22 in the manufacturing process.

In a liquid crystal material constituting the liquid crystal layer 23, optical characteristics of the liquid crystal material vary when alignment of liquid crystal molecules is controlled in accordance with a voltage (electric field) applied between the substrates 21 and 22. The liquid crystal panel 20_1 of the present embodiment is, for example, in a homogeneous mode. That is, a positive (P-type) nematic liquid crystal having positive dielectric anisotropy is used as the liquid crystal layer 23, and the liquid crystal molecules are aligned in a substantially horizontal direction (XY plane) with respect to the substrate plane when the voltage (electric field) is not applied. In the homogeneous mode, long axes (directors) of the liquid crystal molecules are aligned in the XY plane when no voltage is applied, while the long axes of the liquid crystal molecules are inclined toward the vertical direction (Z direction) when a voltage is applied. The angle of inclination of the liquid crystal molecules changes according to an applied effective voltage. An initial alignment of the liquid crystal layer 23 is controlled by two alignment films each provided on the substrates 21 and 22 so as to sandwich the liquid crystal layer 23. A refractive index of the liquid crystal layer 23 changes depending on whether the liquid crystal molecules are aligned in the XY plane or in the Z direction. Specifically, the refractive index of the liquid crystal layer 23 becomes the highest in a state in which the long axes of the liquid crystal molecules are aligned in the XY plane, and becomes smaller as they become inclined toward the Z direction.

Note that a vertical alignment (VA) mode using a negative (N-type) nematic liquid crystal may be used as the liquid crystal mode. In the VA mode, the long axes of the liquid crystal molecules are aligned in the Z direction when no electric field is applied, while the long axes of the liquid crystal molecules are inclined toward the XY plane when a voltage is applied.

The electrodes $25a(1)$ and $25a(2)$ and electrodes $25b(1)$ and $25b(2)$ extending in the Y direction are provided in the substrate 21 on the liquid crystal layer 23 side. Interval D0 in the X direction between the electrode $25a(1)$ and the electrode $25b(1)$ and between the electrode $25a(2)$ and the electrode $25b(2)$ is a minimum processing dimension resulting from the manufacturing process at the time of processing the electrodes, and is, for example, 3 μm. Interval D1 in the X direction between the electrode $25b(1)$ and the light shielding mask $30(1)$ and between the electrode $25b(2)$ and the light shielding mask $30(2)$ is, for example, 10 μm. That is, the intervals D0 and D1, the width Wb, and the shift pitch P have the relationship of the following equation (2).

$$P=(D0)+(Wb)+(D1) \qquad (2)$$

Figure 4:
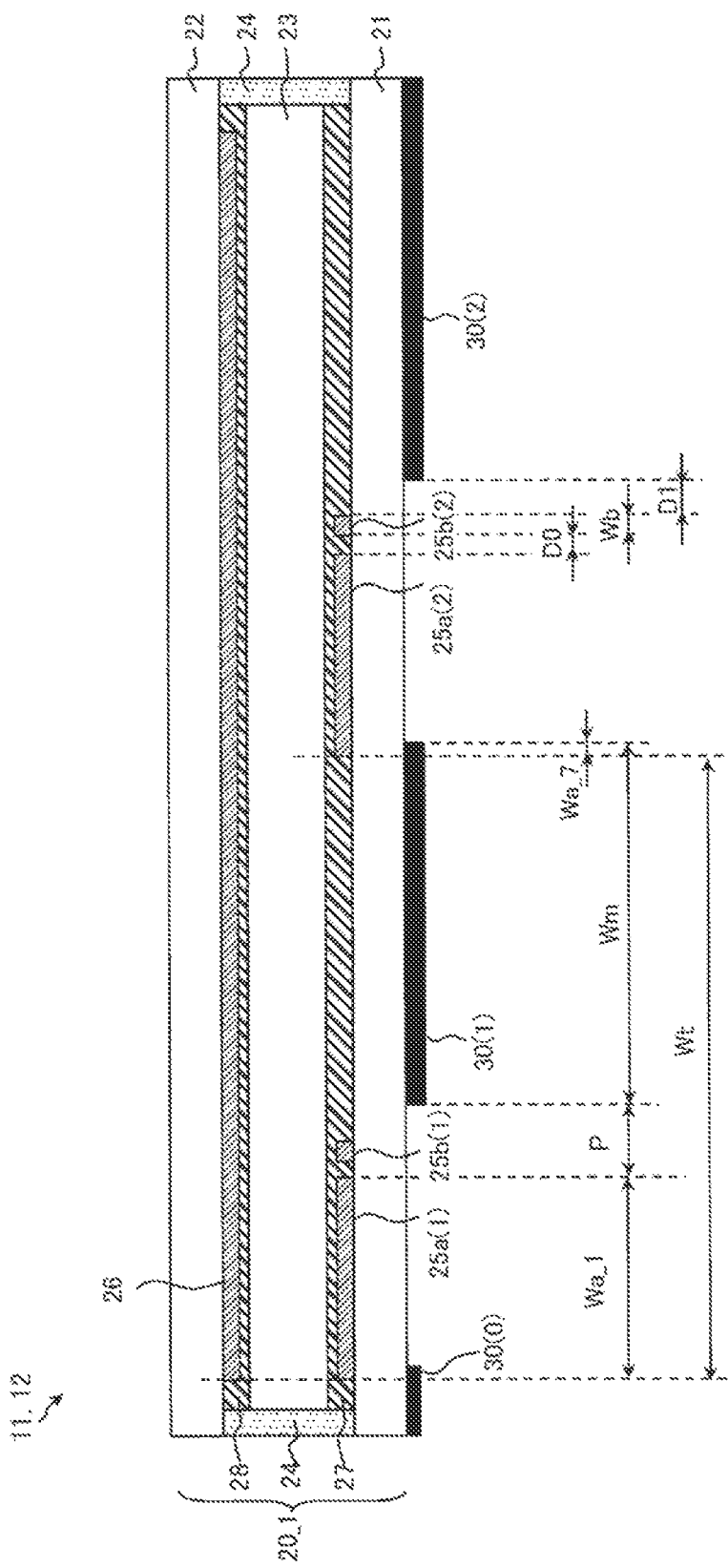
FIG. 4 is a cross-sectional view for explaining a configuration of the liquid crystal panel according to the first embodiment.

In the example of FIG. 4, the positional relationship among the electrodes $25a$ and $25b$ of the liquid crystal panel 20_1 and the light shielding mask 30 has been described, but the above-described equation (2) can also be applied to adjacent liquid crystal panels.

If the liquid crystal panels 20_1 and 20_2 are described as an example, an interval in the X direction between the electrodes $25a$ and $25b$ of the liquid crystal panel 20_2 is set to D0. An interval in the X direction between the right end of the electrode $25b$ of the liquid crystal panel 20_2 and the right end of the electrode $25a$ of the liquid crystal panel 20_1 is set to D1. Accordingly, as for the adjacent liquid crystal panels, the above-described equation (2) is established for the positional relationship among the three electrodes, that is, the electrodes $25a$ and $25b$ on one side and the electrode $25a$ on the other side.

An alignment film 27 for controlling initial alignment of the liquid crystal layer 23 is provided on the substrate 21 and the electrodes $25a$ and $25b$.

A common electrode 26 is provided on the substrate 22 on the liquid crystal layer 23 side. The common electrode 26 is provided in a planar shape over the entire surface of the substrate 22. An alignment film 28 for controlling the initial alignment of the liquid crystal layer 23 is provided on the substrate 22 and the common electrode 26. The common electrode 26 may be disposed on the substrate 21, and the electrodes $25a$ and $25b$ may be disposed on the substrate 22.

Each of the electrodes $25a$ and $25b$ and the common electrode 26 is made of a transparent electrode, and indium tin oxide (ITO) is used, for example.

As the liquid crystal panel 20 configured as described above, a liquid crystal on silicon (LCOS) method-adopting transmissive liquid crystal element (transmissive LCOS) may be used. Use of the transmissive LCOS makes it possible to finely process the electrodes, and the liquid crystal panel 20 can be made smaller. In the transmissive LCOS, a silicon substrate (or a silicon layer formed on a transparent substrate) is used. Since the silicon substrate transmits light (including infrared light) having a wavelength longer than or equal to a specific wavelength in relation to a band gap, an LCOS can be used as a transmissive liquid crystal element. With use of the LCOS, a liquid crystal element with a smaller cell electrode can be realized; thus, the size of the liquid crystal element can be reduced.

[1-2-3] Circuit Configuration of Liquid Crystal Panel

Next, a circuit configuration of the liquid crystal panel 20 will be described.

Figure 5:
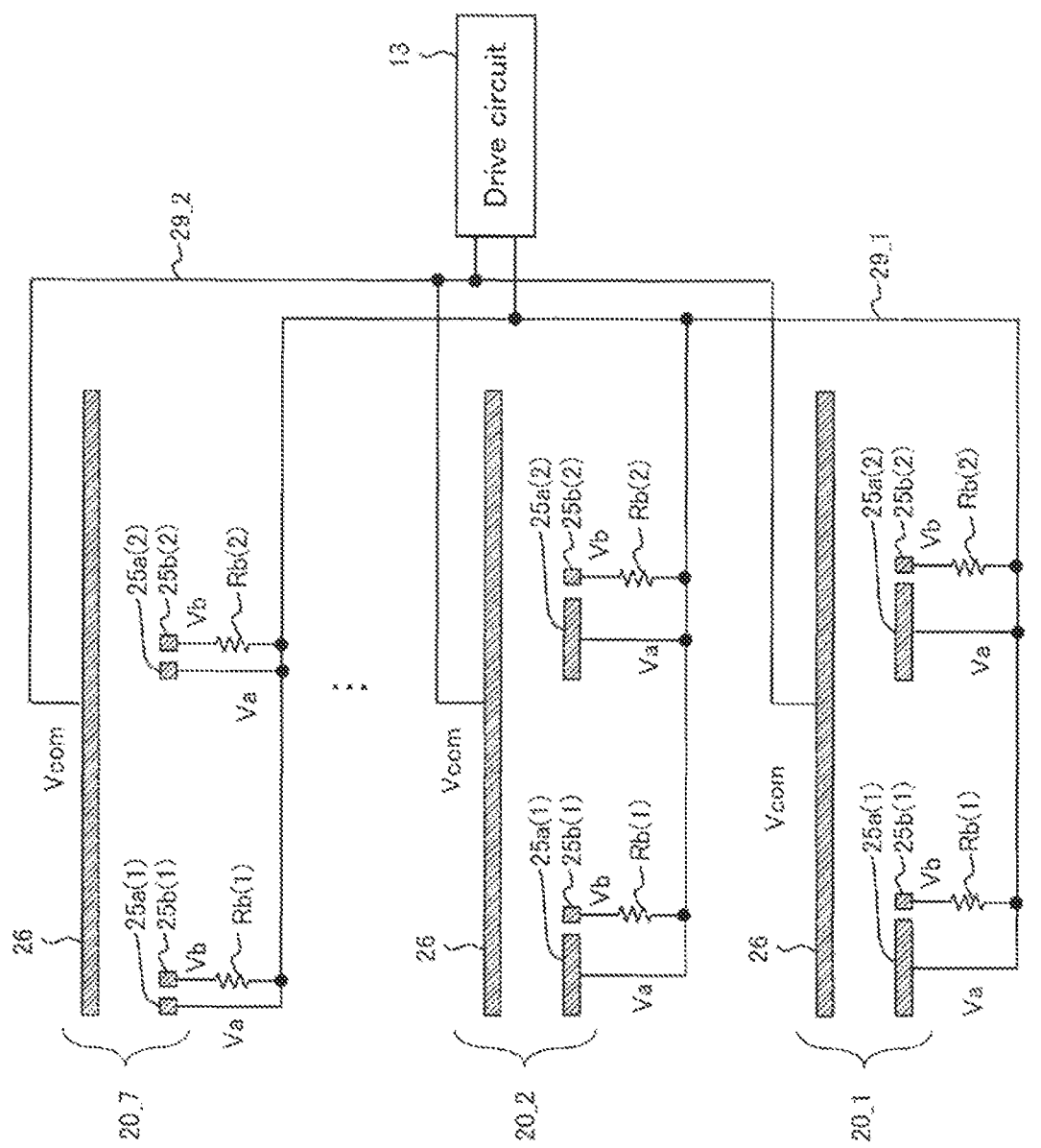
FIG. 5 is a circuit diagram for explaining a configuration of the liquid crystal panel according to the first embodiment.

FIG. 5 is a circuit diagram for explaining a configuration of the liquid crystal panel of the optical deflection apparatus according to the first embodiment.

As shown in FIG. 5, the drive circuit 13 has a function of supplying different voltages to the electrodes $25a$, $25b$, and 26. The drive circuit 13 supplies, for example, positive voltage Va (also described as "+Va") to wiring 29_1, and common voltage Vcom (<Va, for example, Vcom=0V) to wiring 29-2.

The electrodes 25a and 25b included in each of the liquid crystal panels 20_1 to 20_7 are commonly coupled to the wiring 29_1. Each of the electrodes 25a is directly coupled to, for example, the wiring 29_1, and is thereby supplied with the voltage Va. On the other hand, each of the electrodes 25b is coupled to the wiring 29_1 via the resistor Rb. More specifically, the electrodes 25b(1) and 25b(2) are coupled to the wiring 29_1 via the resistors Rb(1) and Rb(2), respectively. The resistors Rb(1) and Rb(2) are set to have an equivalent resistance value. Thus, each of the electrodes 25b is supplied with voltage Vb smaller than the voltage Va applied to the electrodes 25a (Vb<Va). The resistor Rb is a variable resistor, and is configured to be able to adjust the magnitude of the voltage Vb with respect to the voltage Va, for example.

The common electrodes 26 included in each of the liquid crystal panels 20_1 to 20_7 are commonly coupled to the wiring 29_2. Each of the common electrodes 26 is directly coupled to, for example, the wiring 29_2, and is thereby supplied with the voltage Vcom.

With the above-described configuration, each of the liquid crystal panels 20_1 to 20_7 can generate potential difference |Va−Vcom| between the electrode 25a and the common electrode 26, and potential difference |Vb−Vcom| between the electrode 25b and the common electrode 26 which is different from the potential difference |Va−Vcom|. The magnitude of the potential difference |Va−Vcom| can be controlled by changing the magnitude of the voltage Va.

In practice, each liquid crystal panel is AC-driven. For example, the voltage Vcom is set to "0" V, while the voltage Va is set to a rectangular wave (AC voltage) periodically repeating between positive voltage "+Va" and negative voltage "−Va". Alternatively, the voltage Va is set to a rectangular wave (AC voltage) periodically repeating between positive voltage "+Va" and "0" V, while the voltage Vcom is set to a rectangular wave obtained by shifting the phase of the voltage Va by 180 degrees. By such voltage control, each liquid crystal panel can be AC-driven while the above-described potential difference is applied to the liquid crystal layer.

[2] Operation of Optical Deflection Element

Next, the operation of the optical deflection element according to the first embodiment will be described.

[2-1] Relationship between Voltage Applied to Liquid Crystal Panel and Refractive Index First, a description will be given of a relationship between a voltage application operation to the liquid crystal panel 20 and a refractive index distribution of the liquid crystal layer 23 at that time.

Figure 6:
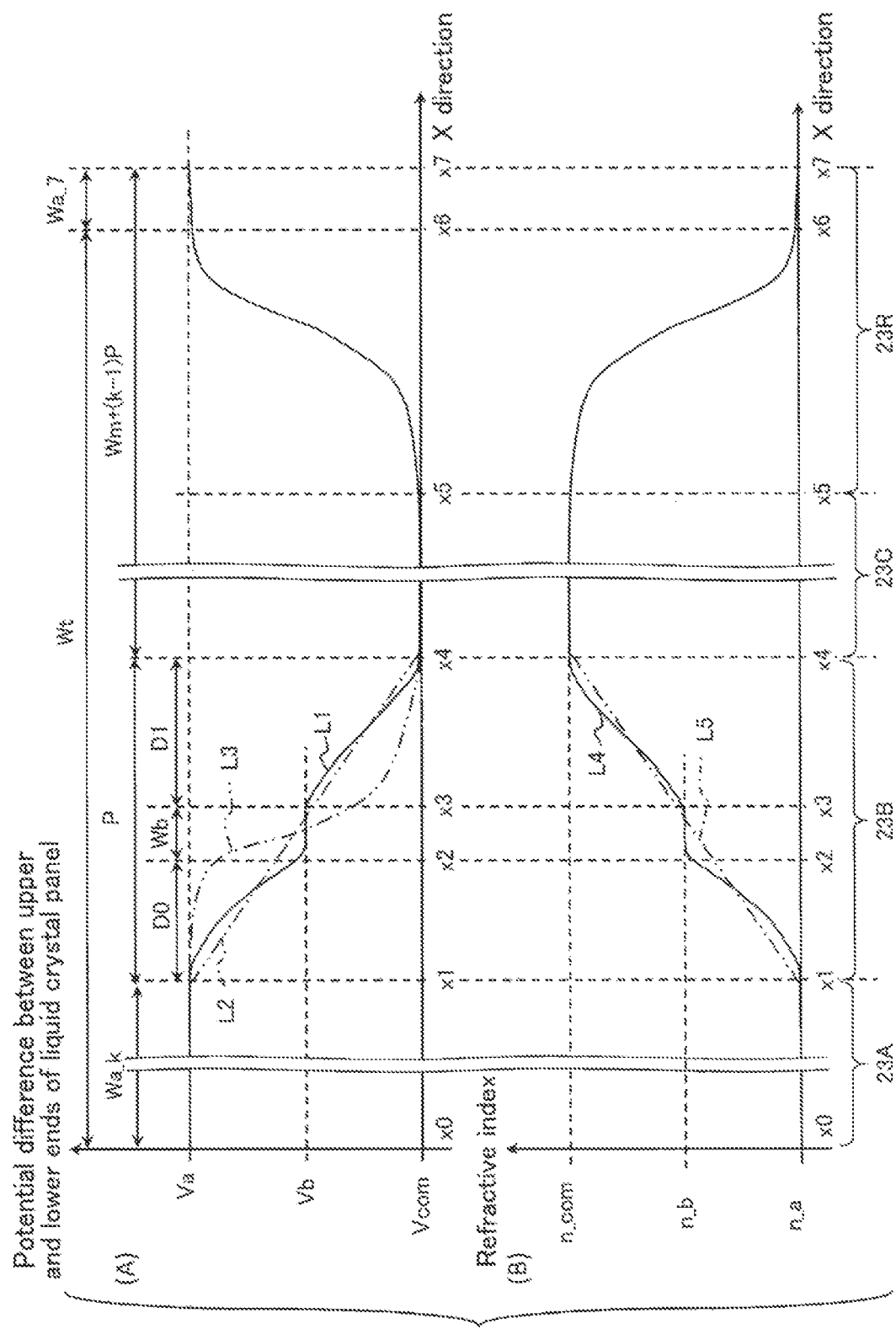
FIG. 6 is a diagram for explaining a relationship between a refractive index and a voltage applied to the liquid crystal panel in the optical deflection element according to the first embodiment.

FIG. 6 is a diagram for explaining a relationship between a voltage applied to the liquid crystal panel and a refractive index according to the first embodiment. Specifically, FIG. 6 (A) indicates, as line L1, a state in which in the liquid crystal panel 20_k (k is an integer of 1≤k≤7), the potential difference (vertical axis) generated at upper and lower ends of the liquid crystal layer 23 changes according to the position in the X direction (horizontal axis). FIG. 6 (B) corresponds to FIG. 6 (A), and indicates, as line L4, a state in which in the liquid crystal panel 20_k, the refractive index (vertical axis) of the liquid crystal layer 23 changes according to the position in the X direction (horizontal axis).

In FIG. 6, the position of the left end of the electrode 25a in the X direction is position x0. A range from position xp to position xq is denoted by range [xp,xq].

As shown in FIG. 6 (A), the electrode 25a of the liquid crystal panel 20_k has width Wa_k. Thus, in the range [x0,x1(=x0+(Wa_k))], the potential difference generated between the upper and lower ends of the liquid crystal layer 23 (hereinafter also simply referred to as the "potential difference of the liquid crystal layer 23") may be substantially fixed to the voltage |Va−Vcom|.

The electrode 25b of the liquid crystal panel 20_k has width Wb. Thus, in the range [x2(=x1+D0),x3(=x2+Wb)], the potential difference of the liquid crystal layer 23 may be substantially fixed to the voltage |Vb−Vcom|.

The range [x4(=x3+D1),x5(<x6=x0+Wt)] is sufficiently far from both the electrodes 25a and 25b. Therefore, in the range [x4,x5], the potential difference of the liquid crystal layer 23 may be substantially fixed to "0".

In a portion of the range [x1,x4] where the electrode 25a or 25b is not provided, the potential difference of the liquid crystal layer 23 monotonically decreases in such a manner that the (absolute value of) change rate of the potential difference increases as the position becomes farther from the electrode. Therefore, if the electrode 25b is not provided in the range [x1,x4], a region in which the change rate of the potential difference of the liquid crystal layer 23 is the largest may occur in the range [x2,x3] as indicated by line L3. However, in the present embodiment, by providing the electrode 25b, the potential difference of the liquid crystal layer 23 in the range [x2,x3] is substantially fixed to Vb. Therefore, in the range [x1,x4], the change rate of the potential difference of the liquid crystal layer 23 of the line L1 is suppressed as compared to the line L3 whose change rate is excessively fluctuating. In other words, the line L1 in the range [x1,x4] comes closer to straight line L2 connecting the potential difference Va at the position x1 and the potential difference "0" at the position x4 as compared to the line L3.

A new repeating unit U starts after the position x6(=x0+Wt); thus, in the range [x6,x7(=x6+Wa_7)], the potential difference of the liquid crystal layer 23 may be substantially fixed to the voltage |Va−Vcom|. Therefore, in the range [x5,x6], the potential difference of the liquid crystal layer 23 monotonically increases in the X direction so that the change rate of the potential difference increases as the position becomes farther from the electrode.

As described above, in the liquid crystal layer 23, as the potential difference between the upper and lower ends of the liquid crystal layer 23 increases, the long axes of the liquid crystal molecules are inclined toward the Z direction, and the refractive index decreases.

Therefore, as shown in FIG. 6 (B), the refractive indexes of the liquid crystal layer 23 in the ranges [x0,x1], [x2,x3], and [x4,x5] may be substantially fixed to the refractive index n_a corresponding to the potential difference |Va−Vcom|, the refractive index n_b(>n_a) corresponding to the potential difference |Vb−Vcom|, and the refractive index n_com (>n_b) corresponding to the potential difference "0", respectively.

By setting the voltage Vb applied to the electrode 25b to an appropriate value, the change rate of the refractive index in the range [x1,x4] is prevented from excessively fluctuating. In other words, the line L4 in the range [x1,x4] comes closer to straight line L5 connecting the refractive index n_a at the position x1 and the refractive index n_com at the position x4.

A new repeating unit U starts after the position x6; thus, in the range [x6,x7], the refractive index of the liquid crystal layer 23 may be substantially fixed to n_a again. Therefore, in the range [x5,x6], the refractive index of the liquid crystal layer 23 monotonically decreases in the X direction in such a manner that the change rate of the refractive index increases as the position becomes farther from the electrode.

In the following description, a region in which the refractive index is substantially fixed at n_a is defined as a region 23A, a region in which the refractive index monotonically increases from n_a to n_com in the X direction is defined as a region 23B, and a region in which the refractive index is substantially fixed at n_com is defined as a region 23C. A region in which the refractive index monotonically decreases from n_com to n_a in the X direction is defined as a region 23R (reset region).

Figure 7:
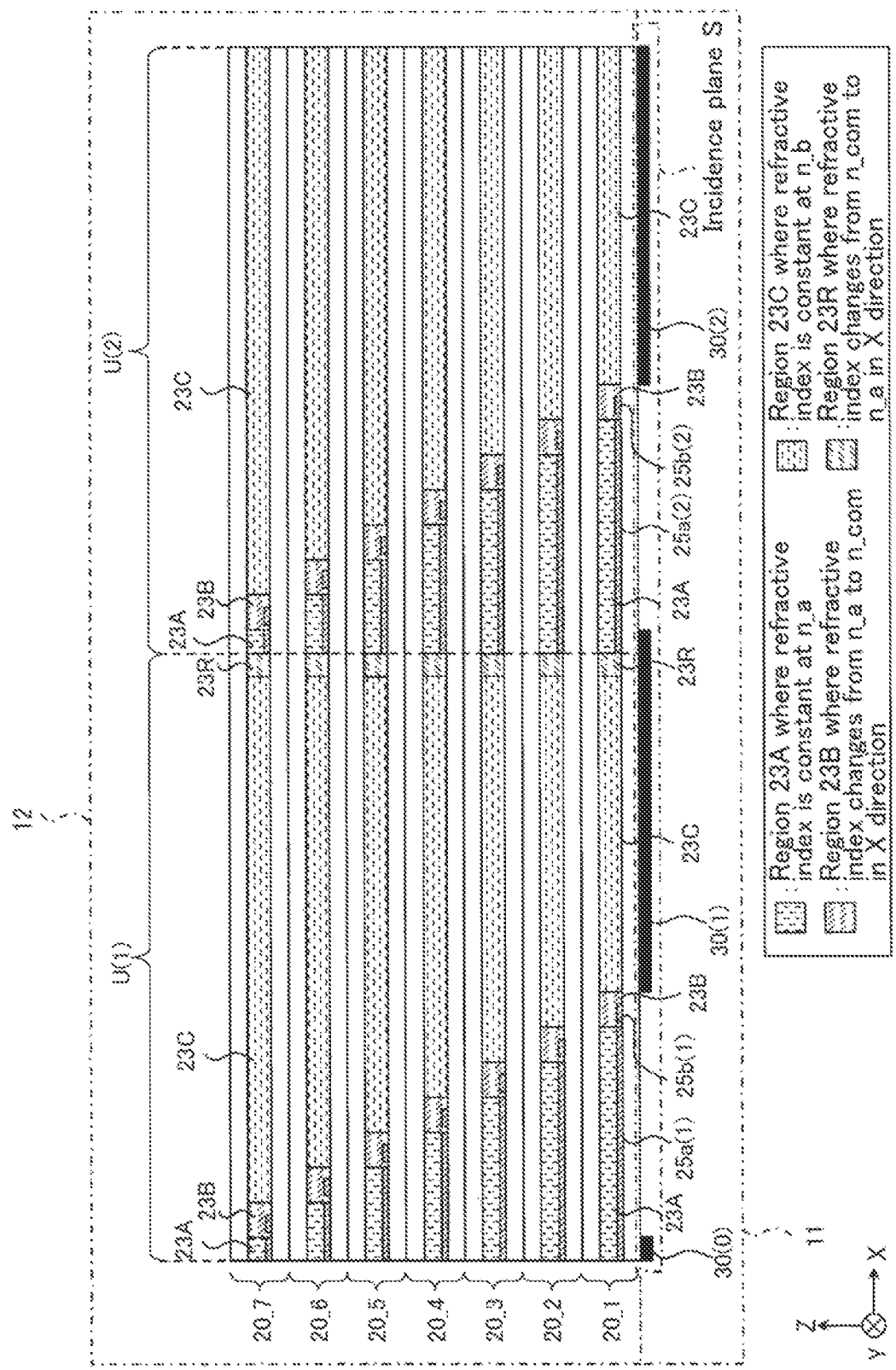
FIG. 7 is a schematic cross-sectional view for explaining a distribution of the refractive index in the optical deflection element according to the first embodiment.

FIG. 7 is a schematic cross-sectional view for explaining a distribution of refractive indexes of all liquid crystal panels in the optical deflection element according to the first embodiment. In FIG. 7, the region 23A is hatched by a vertical broken line, the region 23B is hatched by a downward-right broken line, and the region 23C is hatched by a horizontal broken line. Further, in FIG. 7, the reset region 23R is hatched by an upward-right broken line.

As shown in FIG. 7, in each of the liquid crystal panels 20_1 to 20_7, the above-described regions 23A, 23B, 23C, and 23R are formed according to the position where the electrodes 25a and 25b are disposed. More specifically, the optical deflection element 12 is, in the Z direction, classified into a first part in which all of the liquid crystal panels 20_1 to 20_7 are the regions 23A, 23C, or 23R, and a second part occupied by the regions 23B of the liquid crystal panels 20_1 to 20_7.

The incidence plane limiting unit 11 is disposed so as to limit the incidence of the laser beam on the above-described first part of the incidence plane S. In other words, the incidence plane limiting unit 11 is disposed to have an opening part which the laser beam can enter from the second part of the incidence plane S excluding the first part.

[2-2] Deflection Operation

Next, a deflection operation of the optical deflection element 12 will be described in more detail.

Figure 8:
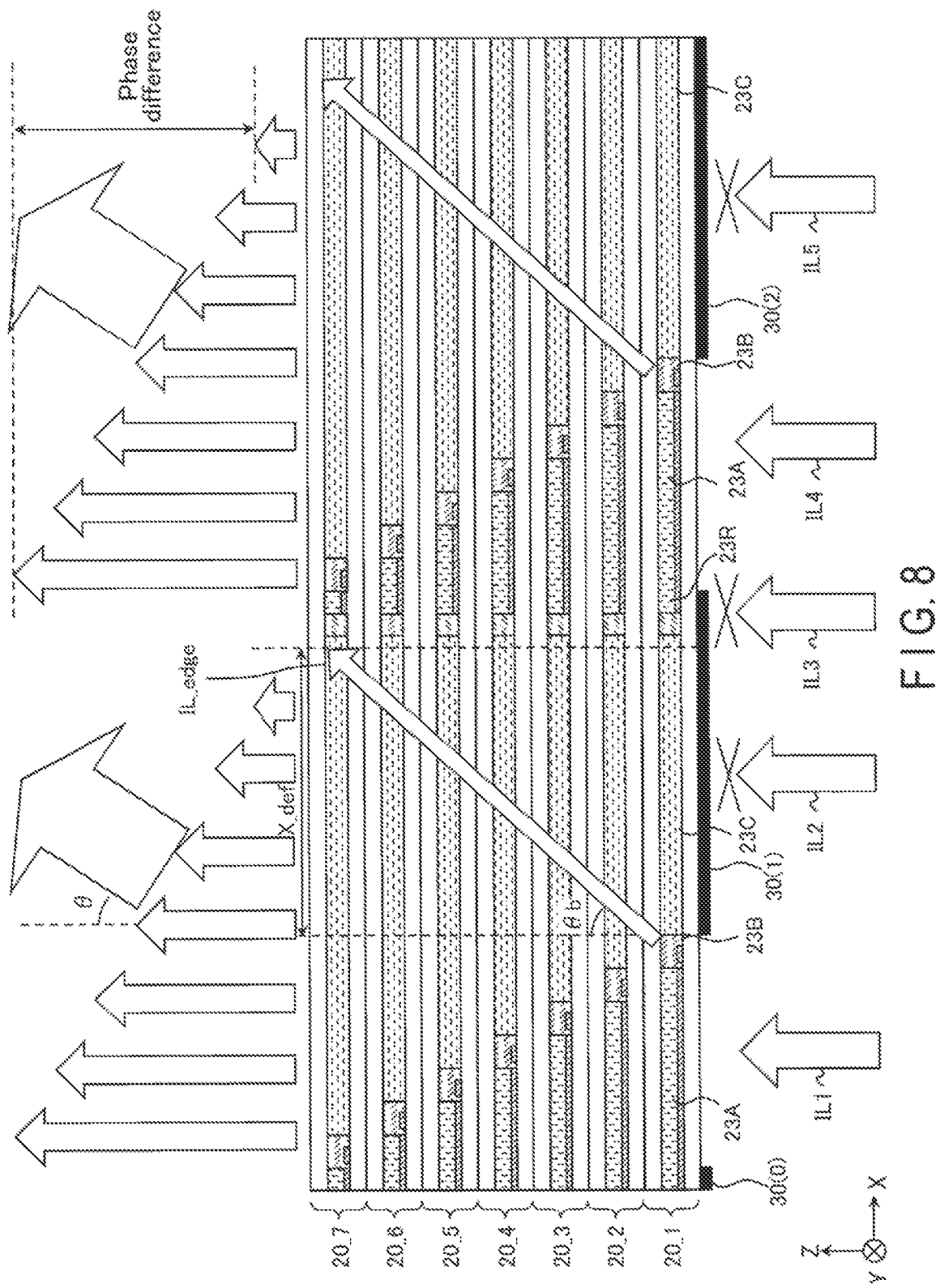
FIG. 8 is a schematic cross-sectional view for explaining a deflection operation of a laser beam in the optical deflection apparatus according to the first embodiment.

FIG. 8 is a schematic cross-sectional view for explaining a deflection operation in the optical deflection apparatus according to the first embodiment. In FIG. 8, laser beams IL1 to IL5 emitted toward the optical deflection element 12 are schematically shown. The laser beams IL1 and IL4 are laser beams incident on the region 23A or 23B in the liquid crystal panel 20_1. The laser beams IL2 and IL5 are laser beams incident on the region 23C in the liquid crystal panel 20_1. The laser beam IL3 is a laser beam incident on the region 23R in the liquid crystal panel 20_1.

FIG. 8 shows an example in which the optical deflection element 12 deflects the laser beam to the right at deflection angle G. In FIG. 8, similarly to FIG. 7, the regions 23A, 23B, 23C, and 23R are hatched by a vertical broken line, a downward-right broken line, a horizontal broken line, and an upward-right broken line, respectively.

A portion of the optical deflection element 12 including at least one region 23B in the Z direction has a gradient of refractive indexes that increase in order in the X direction. In this portion, the leftmost side has the largest number of regions having a low refractive index, while the rightmost side has the largest number of regions having a high refractive index. In a region having a low refractive index, light travels at a high speed, whereas in a region having a high refractive index, light travels at a low speed. That is, the laser beam transmitted through the region having the lowest refractive index and the laser beam transmitted through the region having the highest refractive index have a predetermined phase difference. Therefore, in the example of FIG. 8, the optical deflection element 12 can deflect the laser beam to the right side.

It is assumed that the deflection angle is θ, the retardation per liquid crystal panel 20 is R, the total thickness of the substrates 21 and 22 per liquid crystal panel 20 is t, and the refractive index of the substrates 21 and 22 is n, and the shift pitch is P. It is assumed that the liquid crystal molecules of the liquid crystal panel 20 are homogeneously aligned, and the polarization axis of the laser beam is incident to be parallel to the directors of the liquid crystal molecules. In this case, the deflection angle θ is expressed by the following equation (3).

$$\theta = \sin^{-1}\left(\frac{R + \left(\frac{tn}{\cos\left(\sin^{-1}\left(\frac{R}{np}\right)\right)} - tn\right)}{p + t\tan\left(\sin^{-1}\left(\frac{R}{np}\right)\right)}\right) \quad (3)$$

For example, when the retardation R is 1750 nm, the thickness t is 1000 μm (=500 μm ×2), the shift pitch P is 20 μm, and the refractive index n is 1.5, the deflection angle θ is calculated to be approximately 3.15 degrees (°) from the equation (3).

On the other hand, in a portion of the optical deflection element 12 in which all of the liquid crystal layers 23 are the regions 23A or 23C in the Z direction, the refractive index does not change in the X direction. The laser beam transmitted through this portion is not deflected because the phase difference does not change in the X direction. In the present embodiment, the laser beams IL2 and IL5 incident on this portion are shielded by the light shielding mask 30. Therefore, it is possible to suppress emission of a laser beam not deflected in the X direction.

In addition, a portion of the optical deflection element 12 including at least one region 23R in the Z direction has a gradient of refractive indexes that decrease in order in the X direction. In this portion, the leftmost side has the largest number of regions having a high refractive index, while the rightmost side has the largest number of regions having a low refractive index. Therefore, in the example of FIG. 8, the optical deflection element 12 may deflect the laser beam incident on the region 23R to the left side. Such a deflection is in an opposite direction when the laser beam is deflected to the right side, and is also a factor of scattering the laser beam, which is not preferable. In the present embodiment, the laser beam IL3 incident on this portion is shielded by the light shielding mask 30. Therefore, scattering of the laser beam can be suppressed.

Next, laser beam IL_edge incident on the region 23B of the liquid crystal panel 20_1 will be focused. As described above, the refractive indexes change from n_a to n_com at the left and right ends of the region 23B. Therefore, the phase difference by retardation R is caused between the left and right ends of the laser beam IL_edge. Thus, the laser beam transmitted through the region 23B of the liquid crystal panel 20_1 is deflected at deflection angle θb represented by the following equation (4).

$$\theta b = \sin^{-1}\left(\frac{R}{np}\right) \quad (4)$$

That is, the laser beam transmitted through the region 23B of the liquid crystal panel 20_1 travels in the X direction by distance X_def represented by the following equation (5).

$$X\_def = t(N_{stack} - 1)\tan(\theta b) \quad (5)$$

For example, when the retardation R is 1750 nm, the thickness t is 1000 μm (=500 μm ×2), the refractive index n is 1.5, and the number of stacks of the liquid crystal panels 20 is seven, the distance X_def is calculated to be approximately 351 μm from the equations (4) and (5).

The laser beam IL_edge may maintain the deflection angle θb as long as the laser beam IL_edge passes through the regions 23C of the liquid crystal panels 20_2 to 20_7. However, if the laser beam IL_edge passes through the region 23R, the laser beam IL_edge may be scattered by being deflected in a direction in which the deflection angle θb decreases. Since the scattered light has a deflection angle different from the deflection angle θ, an unnecessary light component (light component not having the deflection angle θ) is contained in the laser beam emitted from the optical deflection element 12, which is undesirable. Therefore, it is desirable that the liquid crystal layer 23 serving as the region 23R is not included on the light path of the laser beam IL_edge.

The present embodiment is designed such that the width Wm is 520 μm, the width Wa_1 is 123 μm, the width Wa_7 is 3 μm, and the shift pitch P is 20 μm. Thus, the width from the right end of the region 23C of the liquid crystal panel 20_1 to the right end of the repeating unit U is 377 μm. Therefore, even when it is assumed that approximately 20 μm of the region 23R exists in the X direction, approximately 357 μm of the region 23C longer than the distance X_def can be secured. Therefore, it is possible to prevent the laser beam IL_edge from being incident on the region 23R, and it is possible to suppress unexpected scattering of the laser beam and to obtain a laser beam having strong directivity (containing no unnecessary light components).

[3] Advantageous Effects of First Embodiment

According to the first embodiment, in each of the stacked liquid crystal panels 20_1 to 20_7, the electrodes 25a and 25b are disposed for each repeating unit U. The width Wa of the electrode 25a is set so as to change in a stepwise manner by the shift pitch P in the stacking order. The electrode 25b has the constant width Wb, and is arranged within a range of the shift pitch P from the right end of the electrode 25a. Accordingly, when the voltages Va and Vb are applied to the electrodes 25a and 25b, respectively, it is possible to form a region in which the net refractive index in the Z direction smoothly changes in a range from the right end of the electrode 25a of the liquid crystal panel 20_7 to a position shifted to the right side by the shift pitch P from the right end of the electrode 25a of the liquid crystal panel 20_1. Therefore, the optical deflection element 12 can emit a laser beam in which the laser beam incident on this region is deflected by a predetermined deflection angle θ. In addition, by arranging the electrodes 25a and 25b for each repeating unit U, a region in which the refractive index gradually changes is formed in a Fresnel lens shape. Therefore, the deflected laser beam can be emitted with a practical spot diameter. Therefore, it is possible to provide an optical deflection apparatus capable of scanning a laser beam while suppressing an increase in size.

On the incidence plane S of the liquid crystal panel 20_1, the light shielding mask 30(1) is provided to shield light in a range from a position separated by the shift pitch P from the right end of the liquid crystal panel 20_1 in the repeating unit U(1) to the right end of the liquid crystal panel 20_7 in the repeating unit U(2). Thus, the light shielding mask 30 can shield the laser beam IL3 incident on the reset region 23R of the liquid crystal panel 20_1 among the laser beams incident on the incidence plane S. Therefore, it is possible to prevent the laser beam incident on the reset region 23R from being scattered and the value of the deflection angle θ from fluctuating. Furthermore, the light shielding mask 30 can also shield the laser beams IL2 and IL5 incident on a region in which all of the liquid crystal panels 20 are the regions 23A or 23C in the Z direction. Therefore, it is possible to suppress emission of the laser beam in which the phase difference does not change.

The interval from the left end of the light shielding mask 30 to the left end of the electrode 25a in the next repeating unit U is designed to be longer than at least the distance X_def. Thus, it is possible to prevent the laser beam IL_edge, entering from the left end of the light shielding mask 30 and deflected at the deflection angle θb, from entering the reset region 23R formed in the vicinity of the left end of the electrode 25a in the next repeating unit U. Therefore, in addition to scattering caused by the laser beam IL3 directly incident on the reset region 23R from the outside of the optical deflection element 12, occurrence of scattering caused by the laser beam IL_edge incident on the reset region 23R during transmission through the optical deflection element 12 can also be suppressed. Therefore, the optical deflection element 12 can emit the laser beam of the deflection angle θ more accurately.

[4] Modifications

In the first embodiment, a case has been described where two types of electrodes 25a and 25b are provided on the substrate 21 of each of the liquid crystal panels 20_1 to 20_7, but the present invention is not limited thereto. Some modifications will be described below based on types of electrodes provided on the substrate 21. Hereinafter, configurations and operations different from those of the first embodiment will be mainly described, and descriptions of configurations and operations equivalent to those of the first embodiment will be omitted.

[4-1] First Modification

A first modification describes a case where one type of electrode is provided on the substrate 21.

Figure 9:
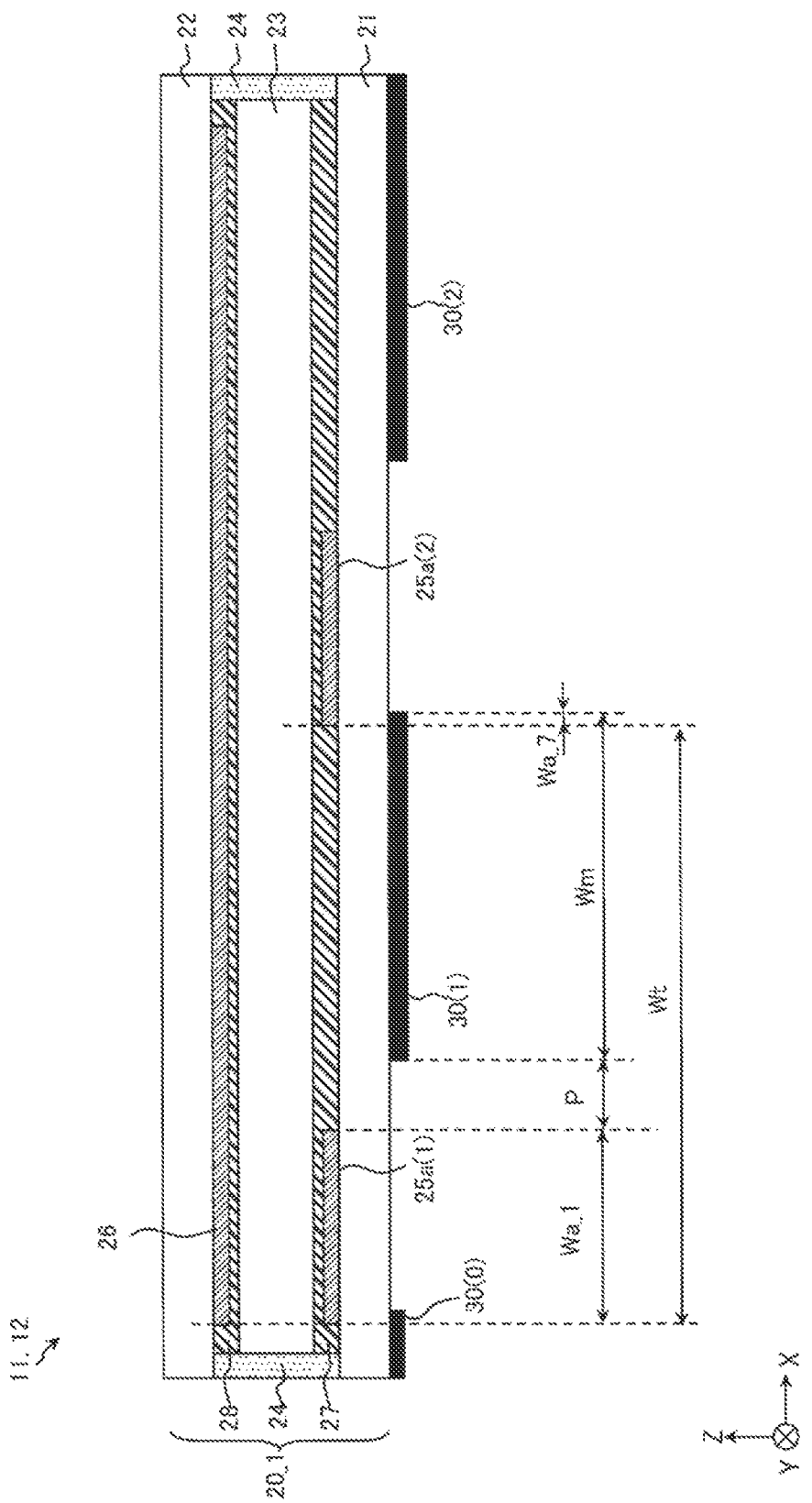
FIG. 9 is a cross-sectional view for explaining a configuration of an incidence plane limiting unit and an optical deflection element according to a first modification of the first embodiment.
Figure 10:
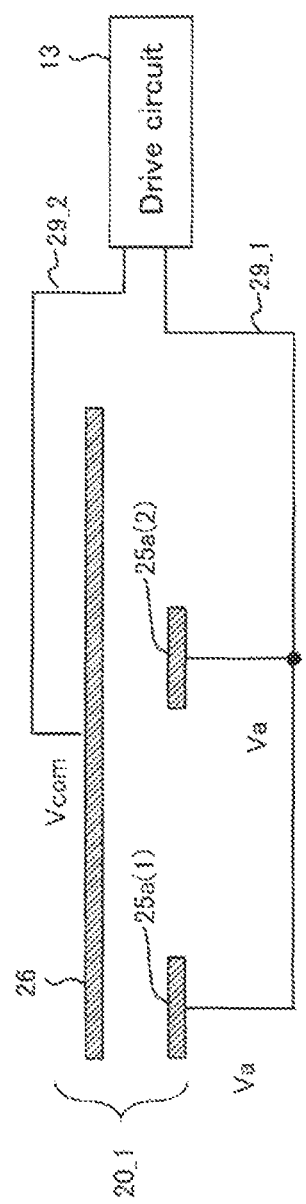
FIG. 10 is a circuit diagram for explaining a configuration of electrodes in the optical deflection element according to the first modification of the first embodiment.

FIGS. 9 and 10 are a cross-sectional view and a circuit diagram, respectively, for explaining electrodes provided in a liquid crystal panel according to the first modification of the first embodiment. FIGS. 9 and 10 correspond to FIGS. 4 and 5, respectively, described in the first embodiment. FIG. 10 shows only the circuit configuration of the liquid crystal panel 20_1 for the sake of convenience of description.

As shown in FIG. 9, the electrodes 25a(1) and 25a(2) may be provided on the liquid crystal layer 23 side of the substrate 21 without providing the electrodes 25b(1) and 25b(2).

In this case, as illustrated in FIG. 10, the resistor Rb that couples the electrode 25b and the wiring 29_1 is also unnecessary, similarly to the electrode 25b.

According to the first modification, since the electrode 25b and the resistor Rb are not necessary, the design of the optical deflection element 12 can be made easy. In addition, even if the electrode 25b is not used, the region 23B in which the refractive index monotonically increases from n_a to n_com in the X direction can be formed in the range [x1,x4], and thus the same effect as that of the first embodiment can be obtained.

[4-2] Second Modification

A second modification describes a case where three types of electrodes are provided on the substrate 21.

Figure 11:
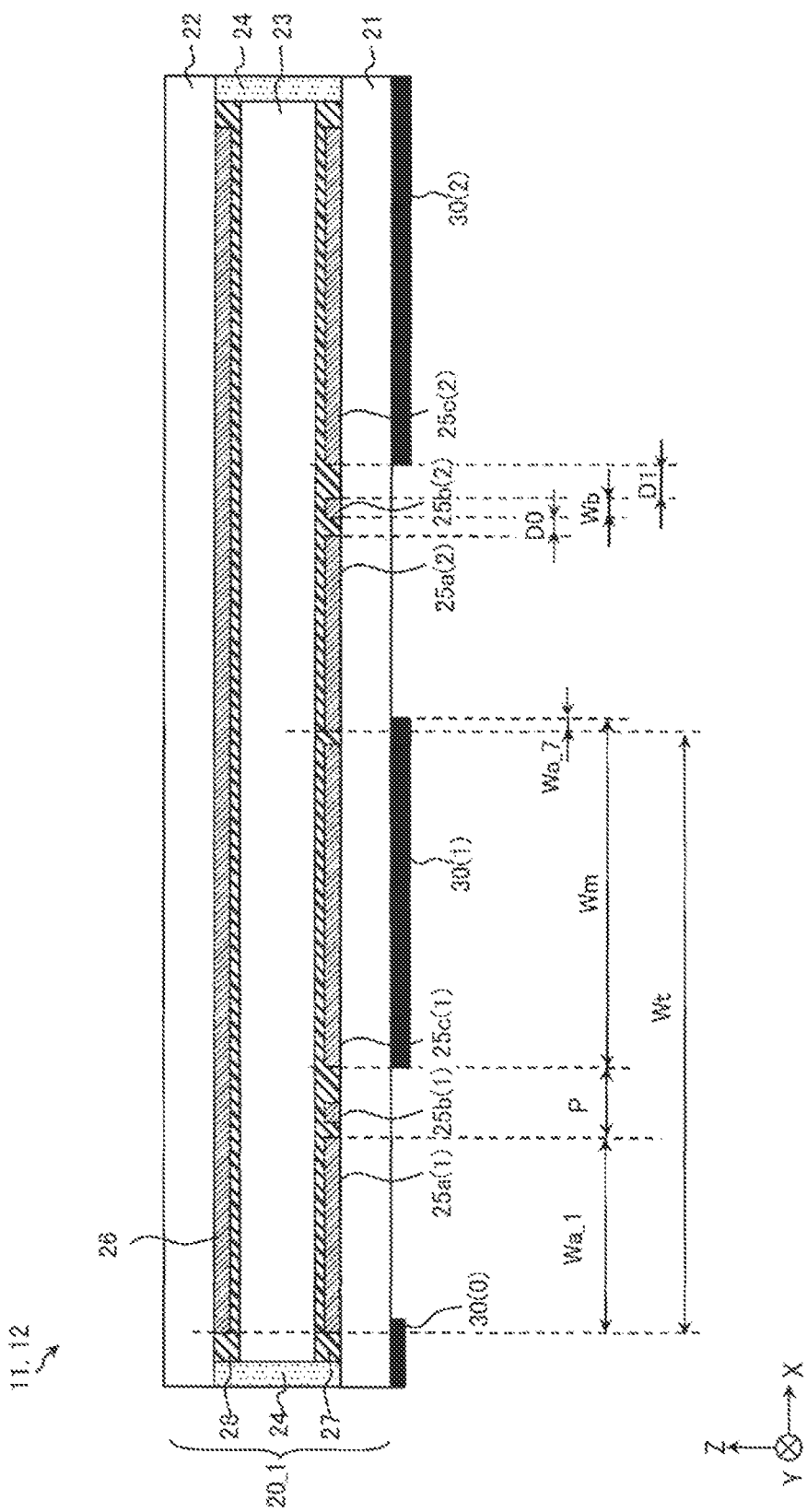
FIG. 11 is a cross-sectional view for explaining a configuration of an incidence plane limiting unit and an optical deflection element according to a second modification of the first embodiment.

FIGS. 11 and 12 are a cross-sectional view and a circuit diagram, respectively, for explaining electrodes provided in a liquid crystal panel according to the second modification of the first embodiment. FIGS. 11 and 12 correspond to FIGS. 4 and 5, respectively, described in the first embodiment. FIG. 12 shows only the circuit configuration of the liquid crystal panel 20_1 for the sake of convenience of description.

As shown in FIG. 11, electrodes 25c(1) and 25c(2) may be further provided on the liquid crystal layer 23 side of the substrate 21 in addition to the electrodes 25b(1) and 25b(2) and the electrodes 25b(1) and 25b(2). The electrode 25c has a function of more accurately setting the potential difference between the upper and lower ends of the liquid crystal panel 20 in the region 23C to "0".

The left end of the electrode 25c is, for example, arranged to coincide with the left end of the light shielding mask 30. In addition, for example, the electrode 25c has a width in which the interval between the right end of the electrode 25c and the left end of the electrode 25a in the next repeating unit U is the minimum processing dimension.

As shown in FIG. 12, multiple electrodes 25c configured as described above are commonly coupled to the wiring 29_2. Each of the electrodes 25c is directly coupled to the wiring 29_2, and is thereby supplied with the voltage Vcom.

With the above-described configuration, each of the liquid crystal panels 20_1 to 20_7 can more accurately set the potential difference between the electrode 25c and the common electrode 26 to "0".

According to the second modification, by further disposing the electrodes 25c, the refractive index in the range [x4,x5] illustrated in FIG. 6 can be more accurately set to the refractive index n_com.

Moreover, by designing the right end of the electrode 25c to be as close as possible to the left end of the electrode 25a in the next repeating unit U, the range [x5,x6] can be reduced to approximately the minimum processing dimension. Thereby, the width of the region 23R can be reduced. Therefore, it is possible to reduce the proportion of the laser beam shielded by the light shielding mask 30, and to suppress a decrease in the transmittance of the laser beam in the optical deflection apparatus 1.

By reversing the voltages applied to the electrodes 25a and 25c, the direction of deflection can be reversed to the left. Therefore, the laser beam can be scanned in a wider range.

[4-3] Third Modification

A third modification describes a case where four types of electrodes are provided on the substrate 21.

Figure 14:
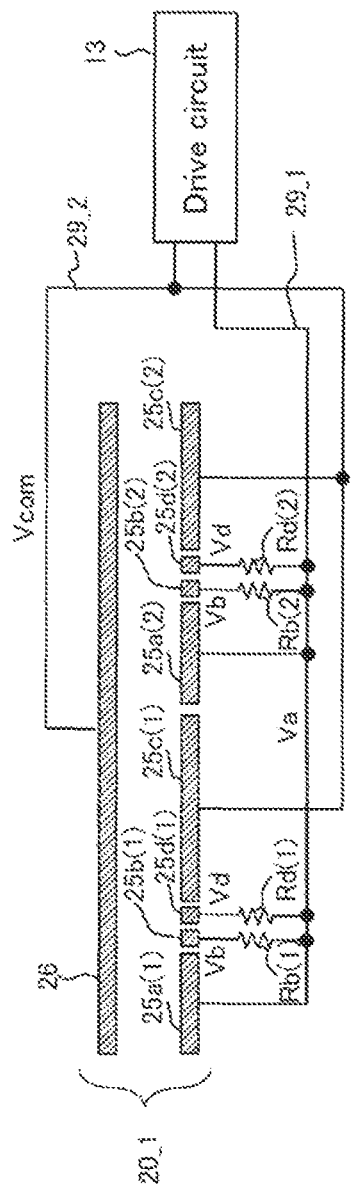
FIG. 14 is a circuit diagram for explaining a configuration of electrodes in the optical deflection element according to the third modification of the first embodiment.

FIGS. 13 and 14 are a cross-sectional view and a circuit diagram, respectively, for explaining electrodes provided in a liquid crystal panel according to the third modification of the first embodiment. FIGS. 13 and 14 correspond to FIGS. 4 and 5, respectively, described in the first embodiment. FIG. 14 shows only the circuit configuration of the liquid crystal panel 20_1 for the sake of convenience of description.

As shown in FIG. 13, electrodes 25d(1) and 25d(2) may be further provided on the liquid crystal layer 23 side of the substrate 21 in addition to the electrodes 25a(1) and 25a(2), the electrodes 25b(1) and 25b(2), and the electrodes 25c(1) and 25c(2). The electrode 25d has, for example, width Wd, and has a function of making the change rate of the potential difference between the upper and lower ends of the liquid crystal panel 20 in the region 23B more constant.

The electrodes 25b and 25d are, for example, evenly arranged between the electrode 25a and the electrode 25c. More specifically, for example, interval D2 in the X direction between the electrode 25b and the electrode 25d and interval D3 in the X direction between the electrode 25c and the electrode 25d are minimum processing dimensions resulting from the manufacturing process when the electrodes are processed, and are, for example, 3 µm. Accordingly, the width Wb of the electrode 25b and the width Wd of the electrode 25d are, for example, 5.5 µm.

As shown in FIG. 14, each of the electrodes 25d configured as described above is commonly coupled to the wiring 29_1 via resistor Rd. The resistor Rd is a variable resistor like the resistor Rb, and for example, is adjusted to a value smaller than the resistor Rb (Rd<Rb).

With the above-described configuration, each of the liquid crystal panels 20_1 to 20_7 can apply the voltage Vd smaller than the voltage Vb to the electrodes 25d, and can set the potential difference |Vd−Vcom| between the electrode 25d and the common electrode 26 to a value smaller than the potential difference |Vb−Vcom| between the electrode 25b and the common electrode 26.

According to the third modification, by further disposing the electrodes 25d, it is possible to control the change rate of the refractive index in the range [x1,x4] shown in FIG. 6 to be closer to a constant value. Therefore, the deflection angle θ can be controlled more accurately.

[4-4] Fourth Modification

A fourth modification describes a configuration in which the change rate of the potential difference between two electrodes can be kept constant without providing three or more types of electrodes on the substrate 21.

Figure 15:
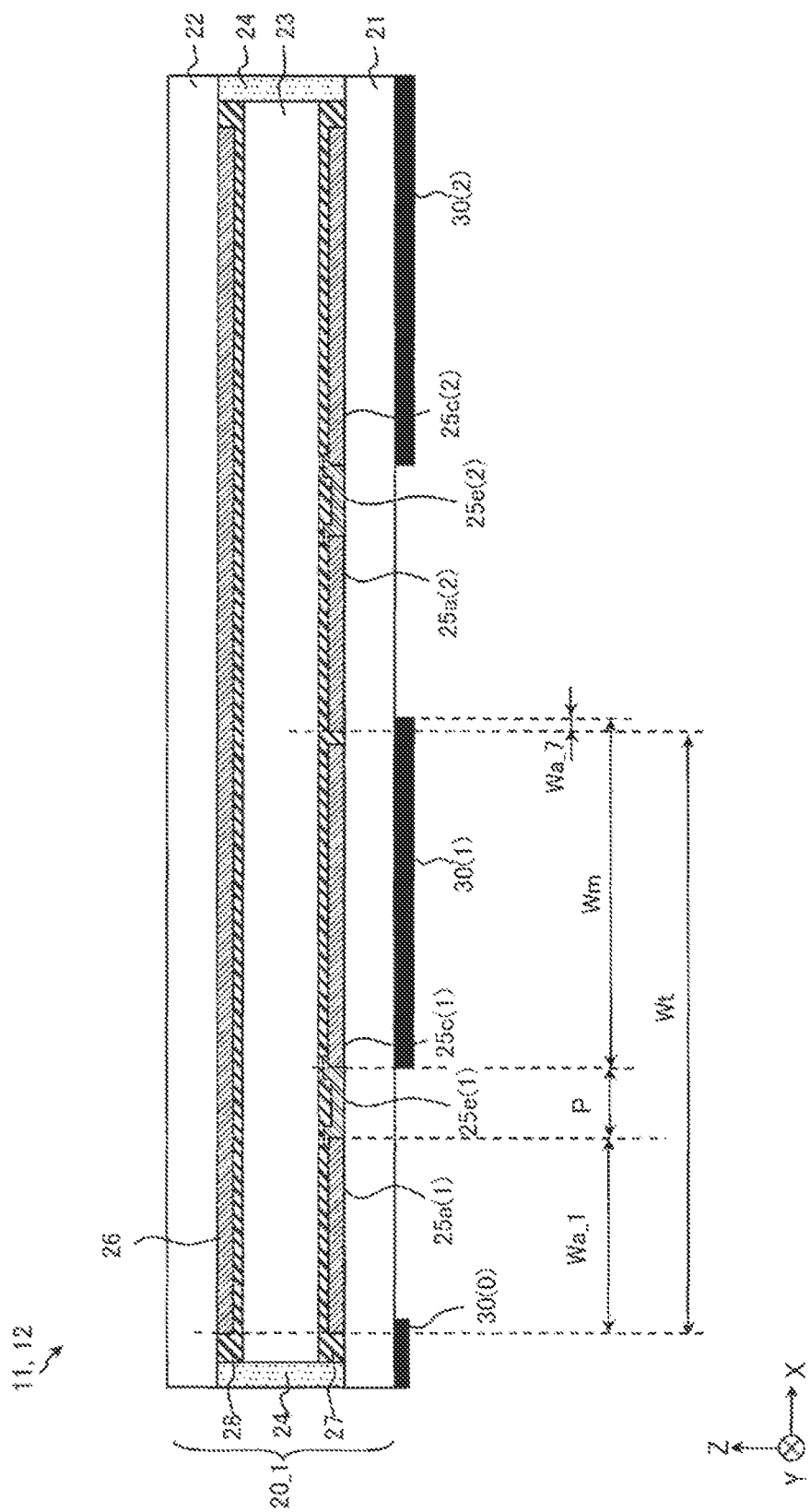
FIG. 15 is a cross-sectional view for explaining a configuration of an incidence plane limiting unit and an optical deflection element according to a fourth modification of the first embodiment.

FIGS. 15 and 16 are a cross-sectional view and a circuit diagram, respectively, for explaining electrodes provided in a liquid crystal panel according to the fourth modification of the first embodiment. FIGS. 15 and 16 correspond to FIGS. 4 and 5, respectively, described in the first embodiment. FIG. 16 shows only the circuit configuration of the liquid crystal panel 20_1 for the sake of convenience of description.

As shown in FIG. 15, high-resistance films 25e(1) and 25e(2) may be further provided on the liquid crystal layer 23 side of the substrate 21 in addition to the electrodes 25a(1) and 25a(2) and the electrodes 25c(1) and 25c(2). The high-resistance film 25e is provided, for example, to fill space between the electrode 25a and the electrode 25c, and is in contact with both the electrode 25a and the electrode 25c. The high-resistance film 25e has a function of making the change rate of the potential difference between the upper and lower ends of the liquid crystal panel 20 in the region 23B more constant. The high-resistance film 25e contains, for example, zinc oxide (ZnO).

As shown in FIG. 16, each of the high-resistance films 25e configured as described above functions as the resistor Re that electrically couples the electrode 25a and the electrode 25c.

With the above-described configuration, each of the liquid crystal panels 20_1 to 20_7 can apply a voltage between the electrode 25a and the electrode 25c so that the voltage decreases at a constant change rate from the electrode 25a to which the voltage Va is applied to the electrode 25c to which the voltage Vcom is applied.

According to the fourth modification, by further disposing the high-resistance films 25e, it is possible to control the change rate of the refractive index in the range [x1,x4] shown in FIG. 6 to be closer to a constant value. Therefore, the deflection angle θ can be controlled more accurately.

Second Embodiment

Next, an optical deflection apparatus according to a second embodiment will be described. The second embodiment differs from the first embodiment in that, before the laser beam to be incident on the optical deflection element 12 is shielded by the light shielding mask 30, a laser beam that may be shielded by the light shielding mask 30 is collected on a region where the laser beam can be incident on the optical deflection element 12. Hereinafter, configurations and operations different from those of the first embodiment will be mainly described, and descriptions of configurations and operations equivalent to those of the first embodiment will be omitted.

[1] Configuration of Incidence Plane Limiting Unit

Figure 17:
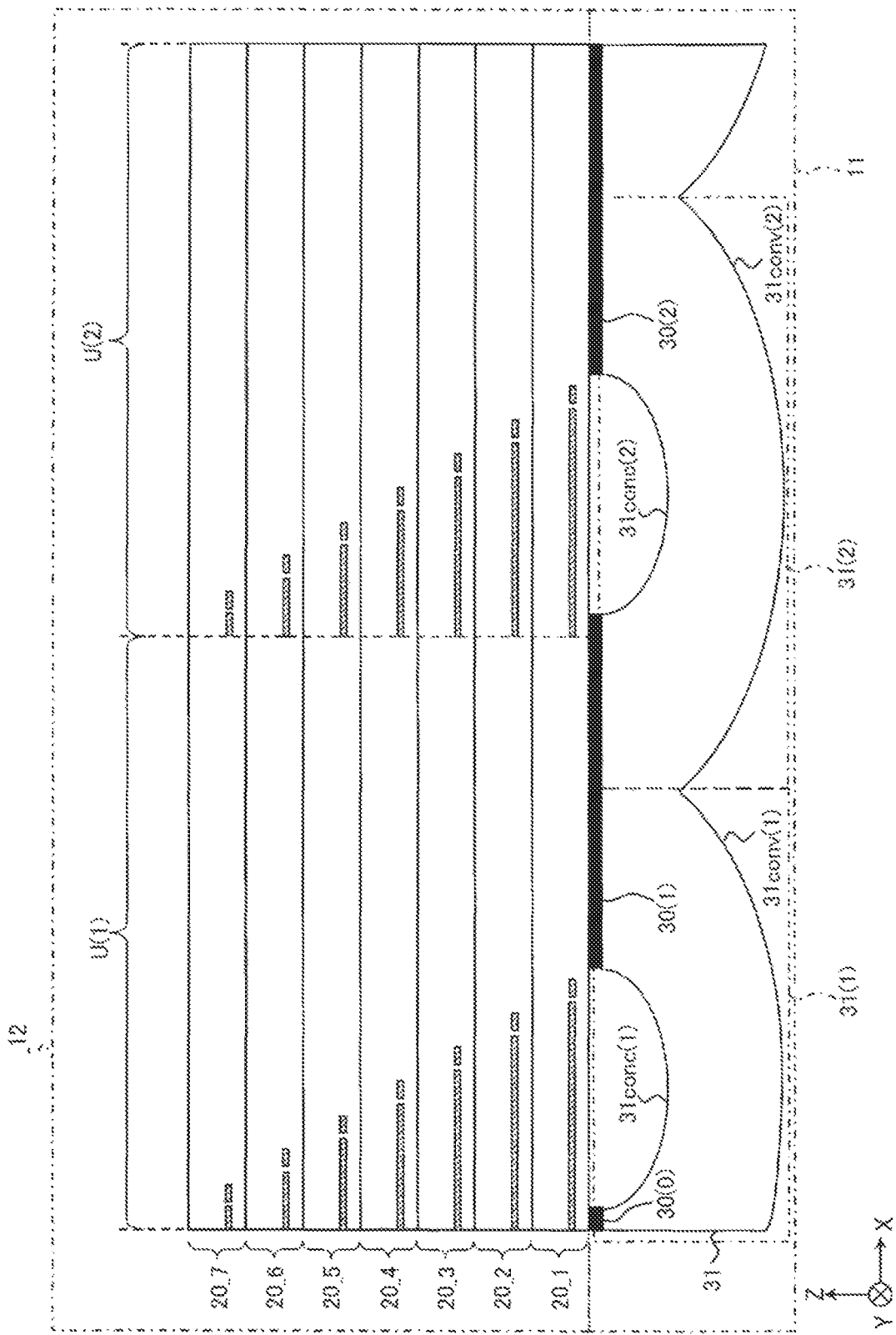
FIG. 17 is a schematic cross-sectional view for explaining a configuration of an incidence plane limiting unit and an optical deflection element according to a second embodiment.

FIG. 17 is a schematic cross-sectional view for explaining an overall configuration of an incidence plane limiting unit and an optical deflection element of the optical deflection apparatus according to the second embodiment. FIG. 17 corresponds to FIG. 2 described in the first embodiment.

As shown in FIG. 17, the incidence plane limiting unit 11 further includes a light-collection optical system 31 in addition to the light shielding mask 30. The light-collection optical system 31 is attached to, using an adhesive, for example, the surface of the light shielding mask 30 on the laser beam incident side.

In the example of FIG. 17, the light-collection optical system 31 includes light-collection optical systems 31(1) and 31(2) according to the repeating units U(1) and U(2) of the optical deflection element 12. More specifically, the light-collection optical system 31(1) includes, for example, a convex lens 31conv(1) and a concave lens 31conc(1), while the light-collection optical system 31(2) includes, for example, a convex lens 31conv(2) and a concave lens 31conc(2).

The convex lens 31conv and the concave lens 31conc have a shape in which a cross section along the XZ plane is a convex lens and a concave lens, respectively, and extend in the Y direction. That is, the convex lens 31conv and the concave lens 31conc have an elliptic cylindrical shape in the Y direction. Hereinafter, the cross-sectional shape along the XZ plane will be described.

The diameter of the convex lens 31conv is larger than the diameter of the concave lens 31conc. A pair of the convex lens 31conv and the concave lens 31conc is arranged so that the distance between the lenses is the sum of the focal lengths of the respective lenses. Thus, the pair of the convex lens 31conv and the concave lens 31conc can constitute a Galilean beam expander. That is, the pair of the convex lens 31conv and the concave lens 31conc can collect the laser beam incident from the convex lens 31conv side on the diameter of the concave lens 31conc, and emit the laser beam in a direction parallel to the laser beam on the incident side.

The light-collection optical system 31 is disposed so that a straight line connecting the focal points of the two lenses passes through the center of the opening part of the light shielding mask 30. In addition, adjacent light-collection optical systems 31 are continuously disposed. With the above-described configuration, the light-collection optical system 31 can cause all laser beams incident on the optical deflection element 12 to be incident on any of the convex lenses 31conv and to be emitted from the concave lens 31conc corresponding to the convex lens 31conv.

The light-collection optical system 31 can be prepared by, for example, bonding two resin sheets. More specifically, a resin sheet having a first surface processed into a shape on the convex lens 31conv side of the light-collection optical system 31 and a resin sheet having a first surface processed into a shape on the concave lens 31conc side are prepared. Then, by bonding second surfaces of the resin sheets, the light-collection optical system 31 can be obtained. As the resin sheet having the convex lens 31conv shape, for example, a lenticular lens is applicable.

[2] Light-collection Operation

Figure 18:
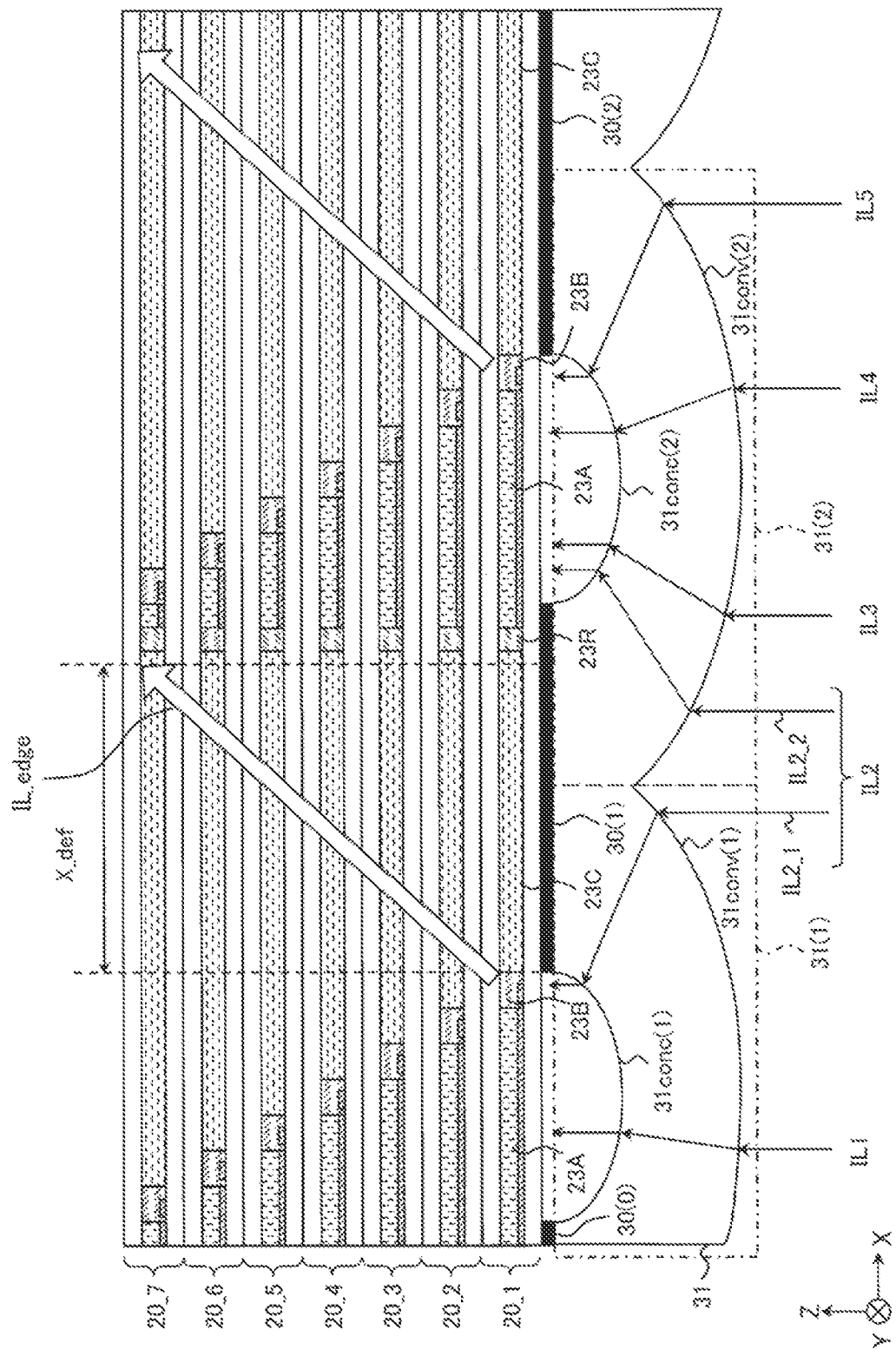
FIG. 18 is a schematic cross-sectional view for explaining a light-collection operation of a laser beam in a light-collection optical system of an optical deflection apparatus according to the second embodiment.

FIG. 18 is a schematic cross-sectional view for explaining a light-collection operation of a laser beam in the light-collection optical system according to the second embodiment. FIG. 18 schematically illustrates optical paths of laser beams IL1 to IL5 in the light-collection optical system 31 when the laser beams IL1 to IL5 are incident on the light-collection optical system 31 described with reference to FIG. 17. The laser beams IL1 to IL5 are the same as those described with reference to FIG. 8. That is, the laser beams IL1 and IL4 are laser beams to be incident on the region 23A or 23B. The laser beams IL2 and IL5 are laser beams to be incident on the region 23C. The laser beam IL3 is a laser beam to be incident on the region 23R. In the following, the optical paths of the laser beams IL2 and IL3 will be particularly described.

As shown in FIG. 18, the laser beam IL2 is classified into laser beam IL2_1 incident on the light-collection optical system 31(1) and laser beam IL2_2 incident on the light-collection optical system 31(2). The laser beam IL2_1 is incident on the convex lens 31conv(1) of the light-collection optical system 31(1), and therefore refracted toward the focal point of the convex lens 31conv(1). Thus, the light-collection optical system 31(1) can emit the laser beam IL2_1 toward the opening part of the light shielding mask 30 in the repeating unit U(1). On the other hand, the laser beam IL2_2 is incident on the convex lens 31conv(2) of the light-collection optical system 31(2), and therefore refracted toward the focal point of the convex lens 31conv(2). Thus, the light-collection optical system 31(2) can emit the laser beam IL2_2 toward the opening part of the light shielding mask 30 in the repeating unit U(2).

Similarly to the laser beam IL_2, the laser beam IL3 is incident on the convex lens 31conv(2) of the light-collection optical system 31(2), and therefore is refracted toward the focal point of the convex lens 31conv(2). Thus, the light-collection optical system 31(2) can also emit the laser beam IL3 toward the opening part of the light shielding mask 30 in the repeating unit U(2).

[3] Advantageous Effects of Second Embodiment

According to the second embodiment, the incidence plane limiting unit 11 includes the light-collection optical system 31. The light-collection optical system 31 includes the concave lens 31conc having a diameter equal to that of the opening part of the light shielding mask 30, and the convex lens 31conv having a diameter larger than that of the concave lens 31conc. Thereby, the light-collection optical system 31 can collect the laser beams IL2, IL3, and IL5 to be incident on the light shielding mask 30 on the opening part of the light shielding mask 30. Therefore, it is possible to reduce the proportion of the laser beam shielded by the light shielding mask 30, and to suppress the reduction of transmittance of the optical deflection element 12.

If the light collection rate of the light-collection optical system 31 is high, the proportion of the laser beam shielded by the light shielding mask 30 becomes small. In this case, scattering of the laser beam incident on the optical deflection element 12 can also be suppressed by the light collecting operation of the light-collection optical system 31. Therefore, if it is determined that the light collection rate of the light-collection optical system 31 is high, the light shielding mask 30 may be omitted.

[4] Modifications

In the second embodiment, a Galilean beam expander that changes a beam diameter by combining a concave lens and a convex lens is applied to the light-collection optical system 31, but the present invention is not limited thereto. For example, a Keplerian beam expander that changes a beam diameter by combining two convex lenses may be applied to the light-collection optical system 31. In the following description, configurations and operations different from those of the second embodiment will be mainly described, and descriptions of configurations and operations equivalent to those of the second embodiment will be omitted.

[4-1] Configuration of Incidence Plane Limiting Unit

Figure 19:
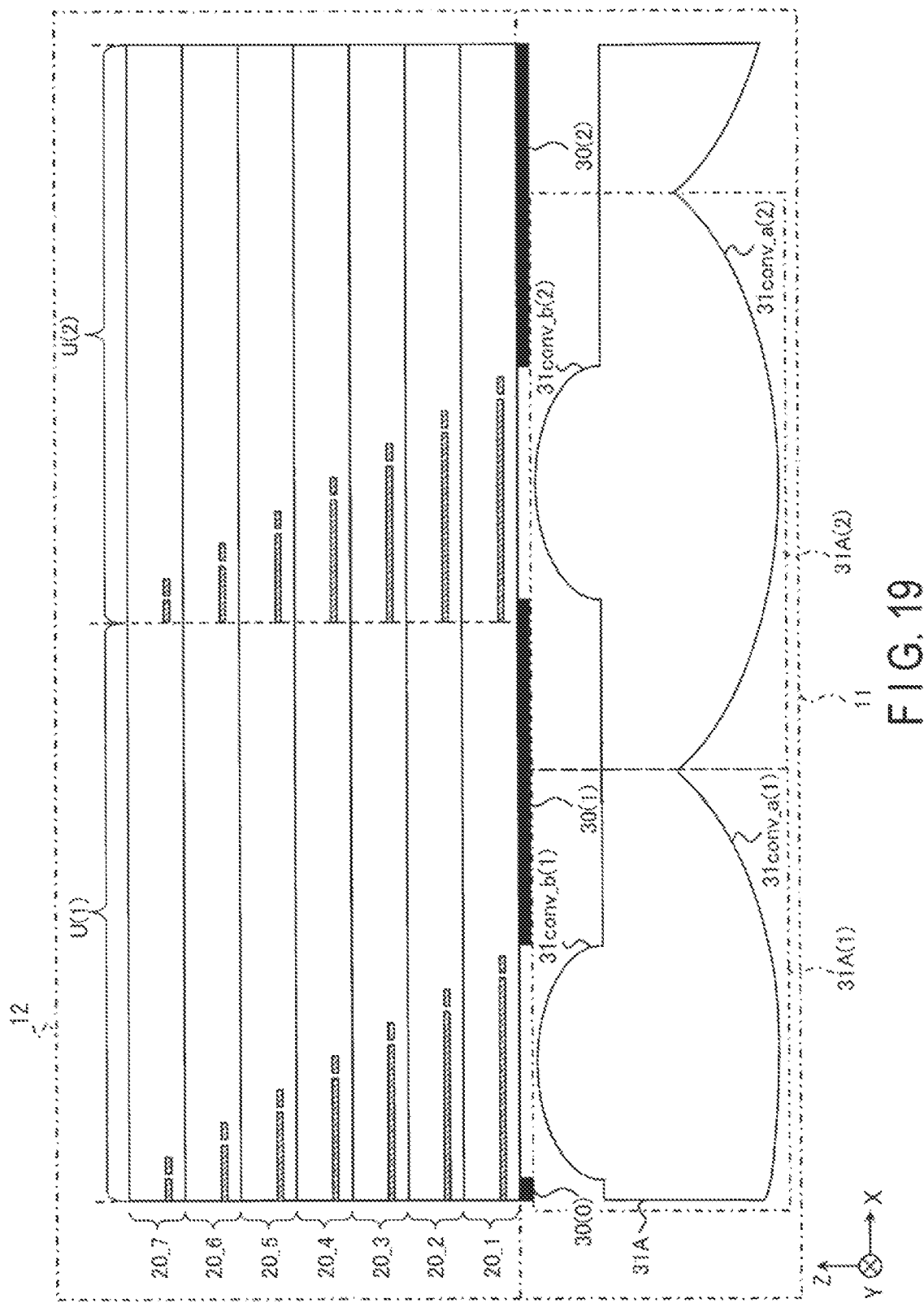
FIG. 19 is a schematic cross-sectional view for explaining a configuration of an incidence plane limiting unit and an optical deflection element according to a modification of the second embodiment.

FIG. 19 is a schematic cross-sectional view for explaining an overall configuration of an incidence plane limiting unit and an optical deflection element of an optical deflection apparatus according to a modification of the second embodiment. FIG. 19 corresponds to FIG. 17 described in the second embodiment.

As shown in FIG. 19, the incidence plane limiting unit 11 includes a light-collection optical system 31A instead of the light-collection optical system 31. The light-collection optical system 31A is, for example, fixed to the light shielding mask 30 in a non-illustrated region.

In the example of FIG. 19, the light-collection optical system 31A includes light-collection optical systems 31A(1) and 31A(2) according to the repeating units U(1) and U(2) of the optical deflection element 12. More specifically, the light-collection optical system 31A(1) includes, for example, two convex lenses 31conv_a(1) and 31conv_b(1), while the light-collection optical system 31A(2) includes, for example, two convex lenses 31conv_a(2) and 31conv_b(2).

The convex lenses 31conv_a and 31conv_b have a shape in which a cross section along the XZ plane is a convex lens, and extend in the Y direction. That is, the convex lenses 31conv_a and 31conv_b have an elliptic cylindrical shape in the Y direction. Hereinafter, the cross-sectional shape along the XZ plane will be described.

The diameter of the convex lens 31conv_a is larger than that of the convex lens 31conv_b. The pair of convex lenses 31conv_a and 31conv_b is arranged so that the distance between the lenses is the sum of the focal lengths of the respective lenses. Thus, the pair of convex lenses 31conv_a and 31conv_b can constitute a Keplerian beam expander. That is, the pair of convex lenses 31conv_a and 31conv_b can collect the laser beam incident from the convex lens 31conv_a side on the diameter of the convex lens 31conv_b, and emit the laser beam in a direction parallel to the laser beam on the incident side.

The light-collection optical system 31A can be prepared by bonding a glass sheet processed into a lenticular lens shape in which the convex lenses 31conv_a are continuous, and a glass sheet processed into a lenticular lens shape in which the convex lenses 31conv_b are continuous.

[4-2] Light-Collection Operation

Figure 20:
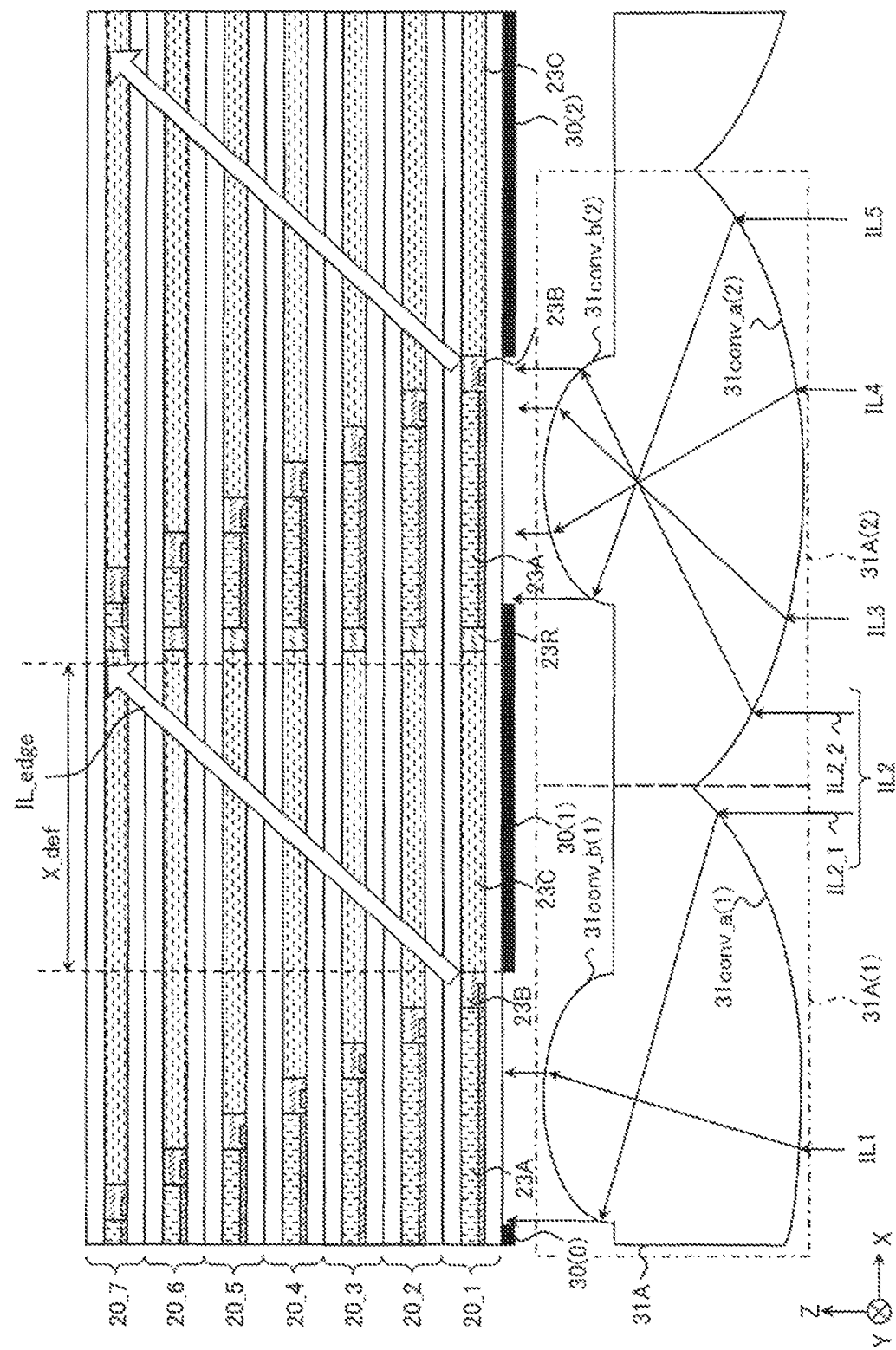
FIG. 20 is a schematic cross-sectional view for explaining a light-collection operation of a laser beam in a light-collection optical system of the optical deflection apparatus according to the modification of the second embodiment.

FIG. 20 is a schematic cross-sectional view for explaining a light-collection operation of a laser beam in the light-collection optical system according to the modification of the second embodiment. FIG. 20 corresponds to FIG. 18 described in the second embodiment, and the light-collection operation is the same except for the optical path in the light-collection optical system 31A.

That is, as shown in FIG. 20, each of the convex lenses 31conv_a and 31conv_b has a positive focal distance. Thus, the laser beam incident from the convex lens 31conv_a is collected at one point (focal point) in the light-collection optical system 31A, and is then emitted to the optical deflection element 12 as a laser beam having a beam diameter along the diameter of the convex lens 31conv_b.

By operating as described above, the light-collection optical system 31A can collect the laser beams IL2, IL3, and IL5 to be incident on the light shielding mask 30 on the opening part of the light shielding mask 30. Therefore, it is possible to reduce the proportion of the laser beam shielded by the light shielding mask 30, and to suppress the reduction of transmittance of the optical deflection element 12.

EXAMPLES

The optical deflection apparatus 1 according to the first embodiment and the second embodiment described above can be implemented by being incorporated into various devices. Examples thereof will be described below.

[1] First Example

The optical deflection apparatus 1 is applicable to, for example, an illumination apparatus.

Figure 21:
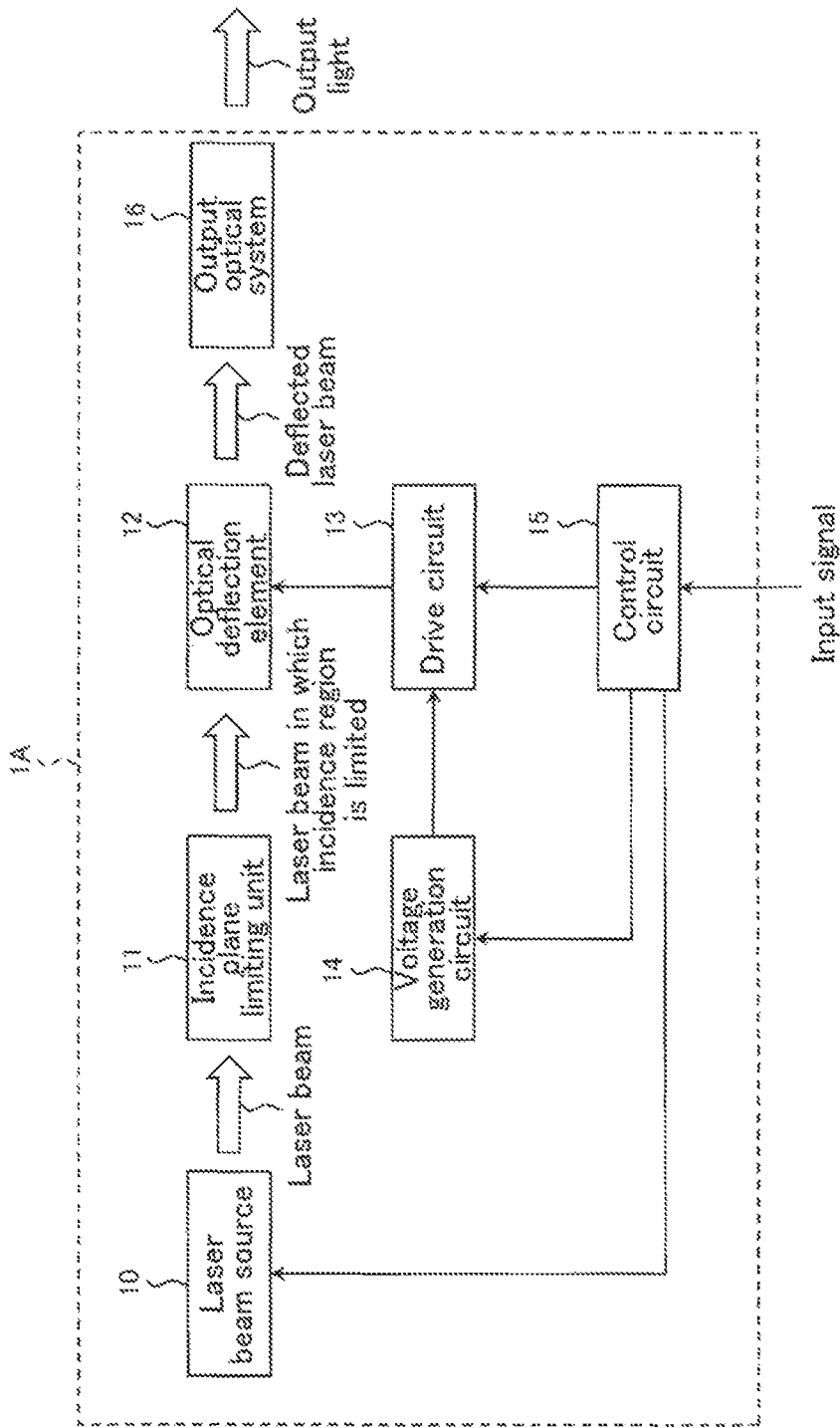
FIG. 21 is a block diagram for explaining a configuration of an illumination apparatus according to a first example of the present invention.
Figure 22:
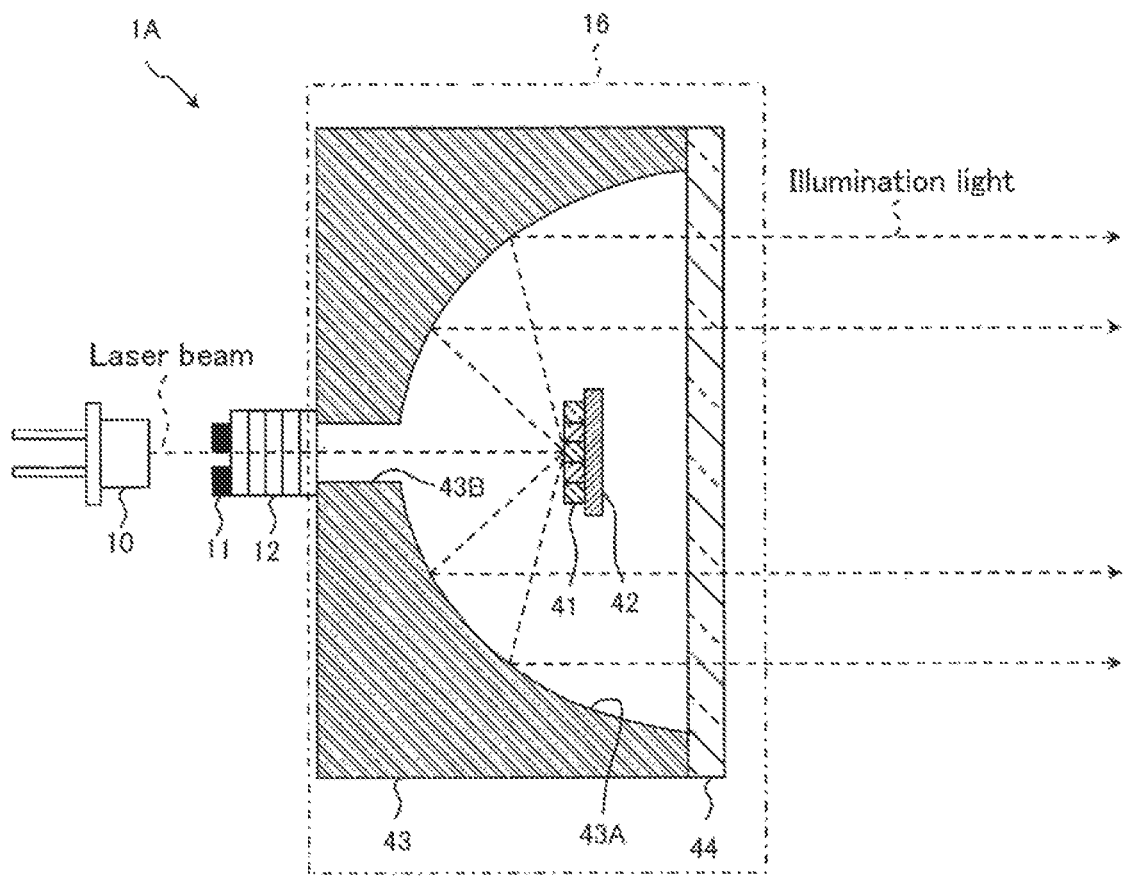
FIG. 22 is a schematic cross-sectional view for explaining a configuration of the illumination apparatus according to the first example of the present invention.

FIGS. 21 and 22 are a block diagram and a schematic cross-sectional view, respectively, for explaining a configuration of an illumination apparatus according to a first example.

As shown in FIG. 21, an illumination apparatus 1A further includes an output optical system 16 in addition to the components of the optical deflection apparatus 1 described above.

The output optical system 16 has a function of converting the laser beam deflected by the optical deflection element 12 into output light having a desired color, and outputting the output light.

As shown in FIG. 22, the output optical system 16 includes, for example, a phosphor unit 41, reflection members 42 and 43, and a transmission filter 44.

The phosphor unit 41 includes a plurality of phosphors (five phosphors in the example of FIG. 22) having different color temperatures. Each phosphor wavelength-converts the laser beam, and emits illumination light (visible light) of a desired color. Specifically, the phosphor emits light (fluorescence) in the process of returning to the original ground state after being excited by absorbing the laser beam. The phosphor unit 41 is fixed to the reflection member 42, for example.

The reflection member 42 is provided on a surface of the phosphor unit 41 opposite to the laser beam source 10. The reflection member 42 is constituted by, for example, a plane mirror. The reflection member 42 reflects the illumination light transmitted through the phosphor unit 41.

The reflection member 43 is formed of, for example, a concave mirror, and reflects the illumination light reflected by the reflection member 42 in the same direction as the traveling direction of the laser beam from the laser beam source 10. The reflection member 43 radiates the illumination light reflected by the reflection member 42 as a substantially parallel line of intersection. The phosphor unit 41 is disposed in the vicinity of the focal point of the reflection member 43. The reflection member 43 has a reflection surface 43A formed of a parabolic curved surface when viewed three dimensionally, and an opening 43B for passing the laser beam emitted from the optical deflection element 12 in the reflection surface 43A.

The transmission filter 44 has properties of, when an ultraviolet wavelength is used as excitation light, transmitting the light wavelength-converted by the phosphor unit 41 and not transmitting ultraviolet light. The transmission filter 44 plays a role of preventing ultraviolet light, which causes an adverse effect on a human body and deterioration of members, from leaking to the outside of the lamp.

According to the illumination apparatus 1A configured as described above, by controlling the deflection angle of the laser beam in the optical deflection element 12, discretionary phosphors in the phosphor unit 41 can absorb the laser beam. Thus, a plurality of output light beams having different colors can be emitted from the single laser beam source 10.

[2] Second Example

The optical deflection apparatus 1 is applicable to, for example, a distance measurement apparatus.

Figure 23:
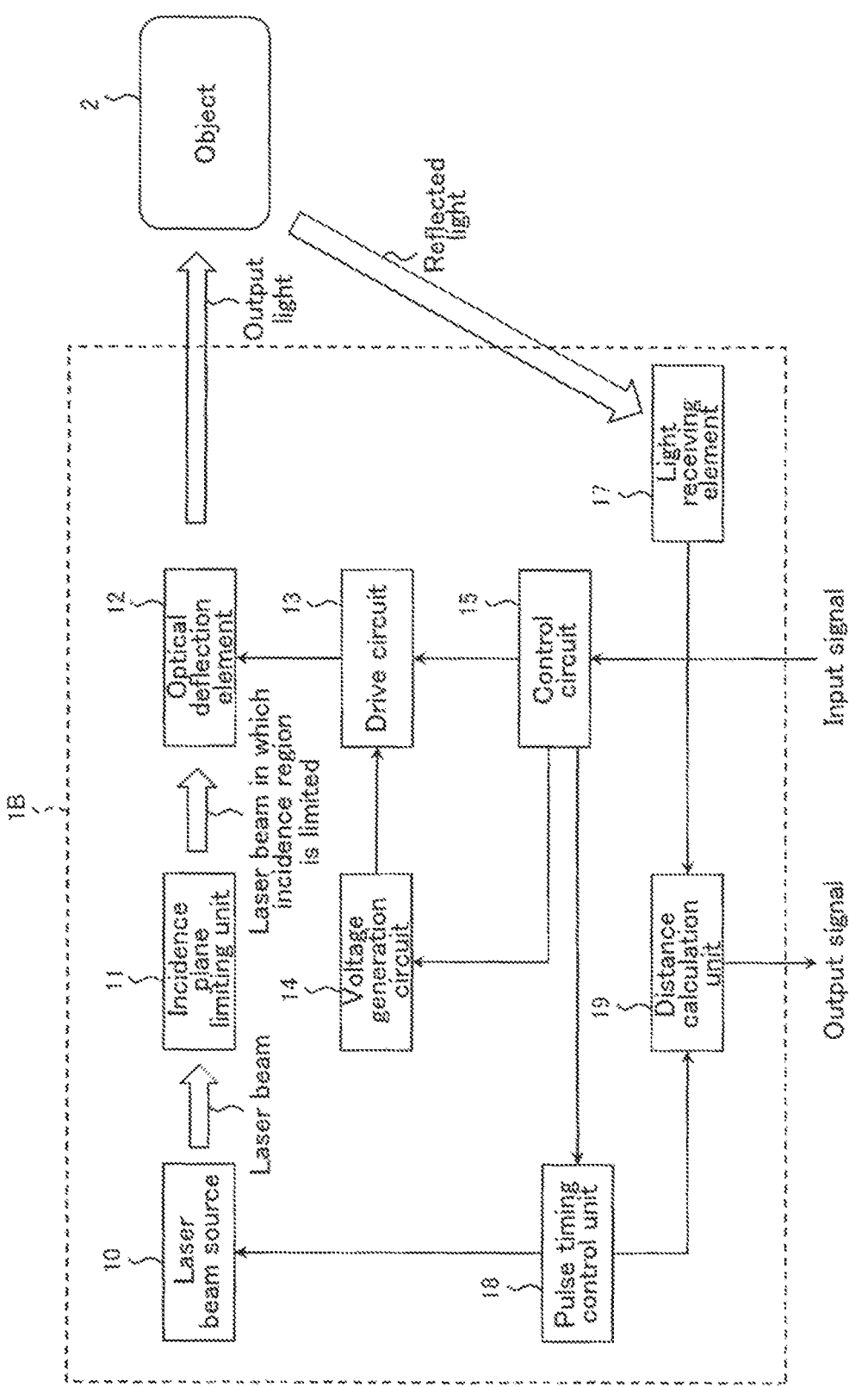
FIG. 23 is a block diagram for explaining a configuration of a distance measurement apparatus according to a second example of the present invention.

FIG. 23 is a block diagram and a schematic cross-sectional view for explaining a configuration of a distance measurement apparatus according to a second example.

As shown in FIG. 23, a distance measurement apparatus 1B has a function of measuring a distance to an object 2 by outputting a laser beam to the object 2. The distance measurement apparatus 1B further includes a light receiving element 17, a pulse timing control unit 18, and a distance calculation unit 19 in addition to the components of the optical deflection apparatus 1 described above.

The light receiving element 17 detects reflected light of the laser beam output to the object 2. The light receiving element 17 includes, for example, an optical sensor (for example, an infrared sensor) configured by a photodiode and a complementary metal oxide semiconductor (CMOS) photosensor.

The pulse timing control unit 18 controls the operation of the laser beam source 10. The laser beam source 10 according to the second example emits a laser beam (that is, pulsed laser beam) as a pulse signal. The pulse timing control unit 18 controls the timing of pulses included in the laser beam. The timing of the pulse includes the cycle, frequency, and pulse width of the pulse signal.

The distance calculation unit 19 receives timing information on the pulse of the laser beam source 10 from the pulse timing control unit 18, receives information on the deflection angle of the laser beam from the control circuit 15, and receives timing information and information on the light intensity of the received reflected light from the light receiving element 17. The distance calculation unit 19 calculates the distance from the distance measurement apparatus 1B to the object 2 using these pieces of information, and outputs the calculated distance as an output signal to the outside of the distance measurement apparatus 1B.

Figure 24:
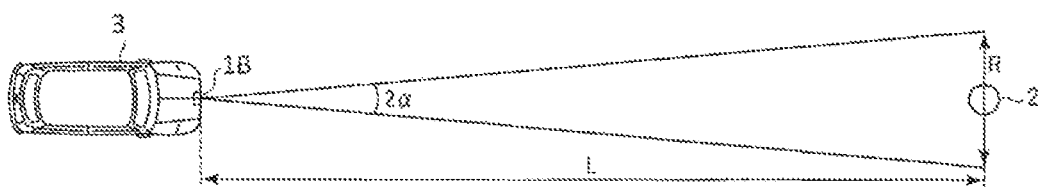
FIG. 24 is a schematic diagram for explaining a basic operation of the distance measurement apparatus according to the second example of the present invention.

FIG. 24 is a schematic view for explaining a basic operation of the distance measurement apparatus according to the second example. FIG. 24 shows, as an example, a case where the distance measurement apparatus 1B is mounted on a vehicle 3, and shows a mode in which the distance measurement apparatus 1B scans the front of the vehicle 3.

As shown in FIG. 24, the optical deflection element 12 included in the distance measurement apparatus 1B scans the laser beam in a scanning range of angle $2\alpha$ by controlling the deflection angle. The light receiving element 17 receives the laser beam reflected by the object 2. It is assumed that the distance to the assumed object 2 is L, and that the scanning range at the distance L is R. For example, if the angle $2\alpha=10$ degrees and the distance L=50 m, the distance measurement apparatus 1B can detect the object 2 existing in the scanning range R=8.7 m at the front of the vehicle 3.

The present invention is not limited to the above-described embodiments, and can be modified in practice, without departing from the gist of the invention. Furthermore, the embodiments described above include inventions at various stages, and various inventions can be configured by an appropriate combination of a plurality of components disclosed in a single embodiment or an appropriate combination of components disclosed in different embodiments. For example, if the object of the invention is achieved and advantages of the invention are attained even after some of the structural elements are deleted from all the structural elements disclosed in the embodiment, the structure made up of the resultant structural elements may be extracted as an invention.

The invention claimed is:

1. An optical deflection apparatus, comprising:
a deflection element that includes an incidence plane for receiving a laser beam emitted from a beam source, and deflects the laser beam; and
an incidence plane limiting unit that is provided between the beam source and the deflection element, and limits incidence of the laser beam on the incidence plane,
the deflection element including a first liquid crystal panel and a second liquid crystal panel that are stacked, each of which including a first repeating unit and a second repeating unit that are aligned in a first direction along the incidence plane,
each of the first liquid crystal panel and the second liquid crystal panel including a first substrate, a second substrate, a first liquid crystal layer filled into a space between the first substrate and the second substrate, a first electrode provided on the first substrate for each of the first repeating unit and the second repeating unit, and a first common electrode provided on the second substrate,
the first electrode of the first liquid crystal panel and the first electrode of the second liquid crystal panel in a same repeating unit including first ends disposed at positions substantially coinciding with each other in the first direction, and second ends disposed at positions different from each other in the first direction, and
the incidence plane limiting unit limiting incidence of the laser beam on a first range of the incidence plane, the first range being included in a range from a first position corresponding to the second end of the first electrode of the first liquid crystal panel in the first repeating unit to a second position corresponding to the second end of the first electrode of the second liquid crystal panel in the second repeating unit.

2. The optical deflection apparatus according to claim 1, wherein the incidence plane limiting unit includes a light shielding mask that shields the laser beam incident on the first range.

3. The optical deflection apparatus according to claim 1, wherein the incidence plane limiting unit includes a light-collection optical system that collects the laser beam incident on the first range on a second range other than the first range of the incidence plane.

4. The optical deflection apparatus according to claim 1, wherein the first range includes at least a third position corresponding to the first end of the first electrode in the second repeating unit.

5. The optical deflection apparatus according to claim 4, wherein the deflection element further includes third liquid crystal panels stacked between the first liquid crystal panel and the second liquid crystal panel,
each of the third liquid crystal panels includes a third substrate, a fourth substrate, a second liquid crystal layer filled into a space between the third substrate and the fourth substrate, a second electrode provided on the third substrate for each of the first repeating unit and the second repeating unit, and a second common electrode provided on the fourth substrate, and the second electrodes of the third liquid crystal panels, the first electrode of the first liquid crystal panel, and the first electrode of the second liquid crystal panel in a same repeating unit include first ends disposed at positions substantially coincident with one another in the first direction, and have widths different by a first pitch in a stacking order.

6. The optical deflection apparatus according to claim 5, wherein the first ends of the first range are disposed at a fourth position away from the first position by the first pitch in the first direction.

7. The optical deflection apparatus according to claim 6, wherein the second ends of the first range are disposed at the second position.

8. The optical deflection apparatus according to claim 7, wherein the second position is located away from the third position by a length of the first electrode of the second liquid crystal panel in the first direction.

9. The optical deflection apparatus according to claim 8, wherein a length from the fourth position to the third position is longer than a distance in which the laser beam incident on the deflection element from the fourth position travels in the first direction until passing through the first liquid crystal layer of the second liquid crystal panel after passing through the first liquid crystal layer of the first liquid crystal panel.

10. The optical deflection apparatus according to claim 9, further comprising a drive circuit configured to apply a first voltage to the first electrode and the second electrode, and to apply a second voltage different from the first voltage to the first common electrode and the second common electrode.

11. The optical deflection apparatus according to claim 1, wherein each of the first liquid crystal panel and the second liquid crystal panel further includes a third electrode that is provided on the first substrate for each of the first repeating unit and the second repeating unit, and adjacent to the first electrode, and
the third electrode is supplied with a voltage lower than a voltage applied to the first electrode.

12. The optical deflection apparatus according to claim 1, wherein the first electrode of the first liquid crystal panel is longer than the first electrode of the second liquid crystal panel in the first direction.

13. The optical deflection apparatus according to claim 1, wherein each of the first liquid crystal panel and the second liquid crystal panel further includes a third common electrode that is provided on the first substrate for each of the first repeating unit and the second repeating unit, and adjacent to the first electrode, and
the third common electrode is supplied with a voltage equal to a voltage applied to the first common electrode.

14. The optical deflection apparatus according to claim 13, wherein the third common electrode of the first liquid crystal panel is shorter than the third common electrode of the second liquid crystal panel in the first direction.

* * * * *